(12) United States Patent
Neuhauser et al.

(10) Patent No.: US 9,640,156 B2
(45) Date of Patent: May 2, 2017

(54) AUDIO MATCHING WITH SUPPLEMENTAL SEMANTIC AUDIO RECOGNITION AND REPORT GENERATION

(71) Applicant: The Nielsen Company (US), LLC, New York, NY (US)

(72) Inventors: Alan Neuhauser, Silver Spring, MD (US); John Stavropoulos, Edison, NJ (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 14/862,508

(22) Filed: Sep. 23, 2015

(65) Prior Publication Data

US 2016/0012807 A1 Jan. 14, 2016

Related U.S. Application Data

(63) Continuation of application No. 13/725,021, filed on Dec. 21, 2012, now Pat. No. 9,158,760, which is a
(Continued)

(51) Int. Cl.
*G10L 15/00* (2013.01)
*G10L 17/00* (2013.01)
(Continued)

(52) U.S. Cl.
CPC ............ *G10H 1/0008* (2013.01); *G06F 17/28* (2013.01); *G10L 19/018* (2013.01); *G10L 25/09* (2013.01);
(Continued)

(58) Field of Classification Search
CPC ....... G10L 19/018; G10L 25/48; G10L 17/26; G10L 25/54; G10L 15/1815;
(Continued)

(56) References Cited

U.S. PATENT DOCUMENTS

| 2,662,168 A | 12/1953 | Scherbatskoy |
| 3,919,479 A | 11/1975 | Moon et al. |

(Continued)

FOREIGN PATENT DOCUMENTS

| EP | 0887958 | 12/1998 |
| WO | 9111062 | 7/1991 |

(Continued)

OTHER PUBLICATIONS

Canadian Intellectual Property Office, "Examination Report," issued in connection with Canadian Patent Application No. 2,896,096, mailed May 9, 2016 (5 pages).

(Continued)

*Primary Examiner* — Edgar Guerra-Erazo
(74) *Attorney, Agent, or Firm* — Hanley, Flight & Zimmerman, LLC

(57) ABSTRACT

System, apparatus and method for determining semantic information from audio, where incoming audio is sampled and processed to extract audio features, including temporal, spectral, harmonic and rhythmic features. The extracted audio features are compared to stored audio templates that include ranges and/or values for certain features and are tagged for specific ranges and/or values. The semantic information may be associated with audio codes to determine changing characteristics of identified media during a time period.

30 Claims, 11 Drawing Sheets

Related U.S. Application Data continuation-in-part of application No. 13/724,836, filed on Dec. 21, 2012, now Pat. No. 9,195,649.

(51) Int. Cl.

| | |
|---|---|
| *G10H 1/00* | (2006.01) |
| *G06F 17/28* | (2006.01) |
| *G10L 19/018* | (2013.01) |
| *G10L 25/09* | (2013.01) |
| *G10L 25/18* | (2013.01) |
| *G10L 25/21* | (2013.01) |
| *G10L 25/24* | (2013.01) |
| *G10L 25/51* | (2013.01) |
| *G10L 25/03* | (2013.01) |

(52) U.S. Cl.
CPC .............. *G10L 25/18* (2013.01); *G10L 25/21* (2013.01); *G10L 25/24* (2013.01); *G10H 2210/041* (2013.01); *G10H 2210/066* (2013.01); *G10H 2210/071* (2013.01); *G10H 2210/076* (2013.01); *G10H 2210/081* (2013.01); *G10H 2240/041* (2013.01); *G10H 2240/085* (2013.01); *G10H 2240/095* (2013.01); *G10H 2250/031* (2013.01); *G10L 25/03* (2013.01); *G10L 25/51* (2013.01)

(58) Field of Classification Search
CPC . G10L 15/1822; G10L 19/02; G10L 21/0272; G10L 25/03; G10L 25/81; G10H 2210/066; G10H 2210/081; G10H 2240/075; G10H 2240/135; G10H 2240/141; G10H 2210/036; G10H 2210/041; G10H 2250/235
USPC .......................................... 704/243, 246, 250
See application file for complete search history.

(56) References Cited

U.S. PATENT DOCUMENTS

| | | | |
|---|---|---|---|
| 4,230,990 A | 10/1980 | Lert, Jr. et al. | |
| 4,450,531 A | 5/1984 | Kenyon et al. | |
| 4,677,466 A | 6/1987 | Lert, Jr. et al. | |
| 4,697,209 A | 9/1987 | Kiewit et al. | |
| 4,739,398 A | 4/1988 | Thomas et al. | |
| 4,843,562 A | 6/1989 | Kenyon et al. | |
| 4,918,730 A | 4/1990 | Schulze | |
| 4,955,070 A | 9/1990 | Welsh et al. | |
| 5,436,653 A | 7/1995 | Ellis et al. | |
| 5,450,490 A | 9/1995 | Jensen et al. | |
| 5,457,768 A * | 10/1995 | Tsuboi ................ | G10L 15/18 704/219 |
| 5,512,933 A | 4/1996 | Wheatley et al. | |
| 5,574,962 A | 11/1996 | Fardeau et al. | |
| 5,579,124 A | 11/1996 | Aijala et al. | |
| 5,581,800 A | 12/1996 | Fardeau et al. | |
| 5,594,934 A | 1/1997 | Lu et al. | |
| 5,612,729 A | 3/1997 | Ellis et al. | |
| 5,764,763 A | 6/1998 | Jensen et al. | |
| 5,787,334 A | 7/1998 | Fardeau et al. | |
| 5,918,223 A | 6/1999 | Blum et al. | |
| 6,201,176 B1 | 3/2001 | Yourlo | |
| 6,574,594 B2 | 6/2003 | Pitman et al. | |
| 6,604,072 B2 | 8/2003 | Pitman et al. | |
| 6,675,174 B1 | 1/2004 | Bolle et al. | |
| 6,871,180 B1 | 3/2005 | Neuhauser et al. | |
| 6,968,564 B1 | 11/2005 | Srinivasan | |
| 6,973,574 B2 | 12/2005 | Mihcak et al. | |
| 6,990,453 B2 | 1/2006 | Wang et al. | |
| 7,003,515 B1 | 2/2006 | Glaser et al. | |
| 7,031,921 B2 | 4/2006 | Pitman et al. | |
| 7,091,409 B2 | 8/2006 | Li et al. | |
| 7,174,293 B2 | 2/2007 | Kenyon et al. | |
| 7,284,255 B1 | 10/2007 | Apel et al. | |
| 7,532,943 B2 | 5/2009 | Weare | |
| 7,582,823 B2 | 9/2009 | Kim et al. | |
| 7,634,406 B2 * | 12/2009 | Li ........................... | G10L 15/19 704/243 |
| 7,640,141 B2 | 12/2009 | Kolessar et al. | |
| 7,647,604 B2 | 1/2010 | Ramaswamy | |
| 7,783,489 B2 | 8/2010 | Kenyon et al. | |
| 7,982,117 B2 | 7/2011 | Alcalde et al. | |
| 8,140,331 B2 | 3/2012 | Lou | |
| 8,244,531 B2 * | 8/2012 | Erhart ................... | G10L 21/045 370/352 |
| 8,769,294 B2 | 7/2014 | Samari et al. | |
| 8,825,188 B2 | 9/2014 | Stone et al. | |
| 8,892,565 B2 | 11/2014 | Xu et al. | |
| 8,959,016 B2 | 2/2015 | McKenna et al. | |
| 2002/0181711 A1 | 12/2002 | Logan et al. | |
| 2005/0177361 A1 | 8/2005 | Srinivasan | |
| 2005/0232411 A1 | 10/2005 | Srinivasan et al. | |
| 2005/0238238 A1 * | 10/2005 | Xu ...................... | G06K 9/00711 382/224 |
| 2007/0250777 A1 | 10/2007 | Chen et al. | |
| 2007/0276667 A1 | 11/2007 | Atkin et al. | |
| 2008/0032622 A1 | 2/2008 | Kopra et al. | |
| 2008/0162561 A1 * | 7/2008 | Naphade ........... | G06F 17/30802 |
| 2008/0195654 A1 | 8/2008 | Weare | |
| 2009/0277322 A1 | 11/2009 | Cai et al. | |
| 2009/0306797 A1 | 12/2009 | Cox et al. | |
| 2009/0313019 A1 | 12/2009 | Kato et al. | |
| 2010/0161315 A1 | 6/2010 | Melamed et al. | |
| 2010/0212478 A1 | 8/2010 | Taub et al. | |
| 2011/0075851 A1 | 3/2011 | LeBoeuf et al. | |
| 2011/0161076 A1 | 6/2011 | Davis et al. | |
| 2012/0203363 A1 | 8/2012 | McKenna et al. | |
| 2014/0019138 A1 | 1/2014 | Stephens, Jr. | |
| 2014/0056432 A1 | 2/2014 | Loui et al. | |
| 2014/0056433 A1 | 2/2014 | Emerson, III | |
| 2014/0180673 A1 | 6/2014 | Neuhauser et al. | |
| 2014/0180674 A1 | 6/2014 | Neuhauser et al. | |
| 2014/0180675 A1 | 6/2014 | Neuhauser et al. | |
| 2014/0195221 A1 | 7/2014 | Frank et al. | |
| 2014/0376729 A1 | 12/2014 | Crockett | |
| 2015/0332669 A1 | 11/2015 | Kalampoukas et al. | |
| 2016/0027418 A1 | 1/2016 | Neuhauser et al. | |
| 2016/0035332 A1 | 2/2016 | Neuhauser et al. | |

FOREIGN PATENT DOCUMENTS

| | | |
|---|---|---|
| WO | 0211123 | 2/2002 |
| WO | 03091990 | 11/2003 |
| WO | 2012168740 | 12/2012 |

OTHER PUBLICATIONS

Bellettini, et al., "A Framework for Robust Audio Fingerprinting," Journal of Communications, vol. 5, No. 5, Academy Publisher, May 2010 (16 pages).

Cano et al., "A Review of Algorithms for Audio Fingerprinting," 2002, IEEE (5 pages).

Haitsma et al., "A Highly Robust Audio Fingerprinting System," 2002, Philips Research, (9 pages).

Harte et al., "Detecting Harmonic Change in Musical Audio," AMCMM '06 Proceedings of the 1st ACM workshop on Audio and music computing multimedia, 2006, pp. 21-26, New York, NY, USA, (5 pages).

Klapuri, A., "Sound Onset Detection by Applying Psychoacoustic Knowledge," Acoustics, Speech, and Signal Processing, Proceedings, IEEE International Conference, 1999, pp. 3089-3092, vol. 6 IEEE, Phoenix, AZ, (4 pages).

Patent Cooperation Treaty, "International Search Report," issued by the International Searching Authority in connection with PCT application No. PCT/US2013/076934, mailed Apr. 22, 2014 (6 pages).

Qing et al., "A Probabilistic Music Recommender Considering User Opinions and Audio Features," Information Processing and Management, 2007, pp. 473-487, vol. 43, (15 pages).

(56) References Cited

OTHER PUBLICATIONS

Tsekeridou et al., "Content-Based Video Parsing and Indexing Based on Audio-Visual Interaction," IEEE Transactions on Circuits and Systems for Video Technology, Apr. 2001, vol. 11, No. 4 (14 pages).
Wang, Avery Li-Chun, "An Industrial-Strength Audio Search Algorithm," Proceedings of the International Conference on Music Information Retrieval (ISMIR), 2003, pp. 7-13, Baltimore, USA, (7 pages).
Wold et al., "Content-Based Classification, Search, and Retrieval of Audio," Muscle Fish, 1996, IEEE (10 pages).
Patent Cooperation Treaty, "International Preliminary Report on Patentability," issued by the International Searching Authority in connection with PCT application No. PCT/US2013/076934, Jun. 23, 2015 (9 pages).
United States Patent and Trademark Office, "Office Action," issued in connection with U.S. Appl. No. 13/724,836 on Oct. 29, 2014 (6 pages).
United States Patent and Trademark Office, "Non-Final Office Action," issued in connection with U.S. Appl. No. 13/725,004 on Nov. 19, 2014 (13 pages).
United States Patent and Trademark Office, "Notice of Allowance," issued in connection with U.S. Appl. No. 13/725,004 on May 29, 2015 (20 pages).
United States Patent and Trademark Office, "Notice of Allowance," issued in connection with U.S. Appl. No. 13/725,021, on Jun. 5, 2015 (8 pages).
United States Patent and Trademark Office, "Notice of Allowance," issued in connection with U.S. Appl. No. 13/724,836, on Mar. 30, 2015 (13 pages).
United States Patent and Trademark Office, "Supplemental Notice of Allowability," issued in connection with U.S. Appl. No. 13/724,836, on May 14, 2015 (2 pages).
United States Patent and Trademark Office, "Notice of Allowance," issued in connection with U.S. Appl. No. 13/724,836, on Jul. 21, 2015 (14 pages).
IP Australia, "Notice of Acceptance," issued in connection with Application No. 2013361099, Apr. 21, 2016, 2 pages.
IP Australia, "Patent Examination Report No. 1," issued in connection with Application No. 2013361099, Feb. 26, 2016, 2 pages.
United States Patent and Trademark Office, "Corrected Notice of Allowability," issued in connection with U.S. Appl. No. 13/724,836, on Sep. 14, 2015 (6 pages).
United States Patent and Trademark Office, "Notice of Allowability," issued in connection with U.S. Appl. No. 13/725,021, on Sep. 15, 2015 (10 pages).
United States Patent and Trademark Office, "Notice of Allowance," issued in connection with U.S. Appl. No. 13/725,004, on Sep. 17, 2015 (12 pages).
United States Patent and Trademark Office, "Supplemental Notice of Allowability," issued in connection with U.S. Appl. No. 13/724,836, Sep. 30, 2015 (6 pages).
United States Patent and Trademark Office, "Supplemental Notice of Allowability," issued in connection with U.S. Appl. No. 13/725,004, Oct. 15, 2015 (6 pages).
United States Patent and Trademark Office, "Non-Final Office Action," issued in connection with U.S. Appl. No. 14/877,296, mailed Jan. 20, 2017 (7 pages).
IP Australia, "Examination Report 1," issued in connection with Australian Patent Application No. 2016208377, mailed Feb. 23, 2017, 2 pages.
United States Patent and Trademark Office, "Non-Final Office Action," issued in connection with U.S. Appl. No. 14/885,216, mailed Mar. 1, 2017 (12 pages).

* cited by examiner

User00001    910

09:20AM -- Talk
09:26AM -- Classical
10:20AM -- Jazz
11:20AM -- Classic Rock
12:00PM -- Talk
02:00PM -- Hard Rock

User00001    911

09:20AM -- Talk, soothing, conversational
09:26AM -- Classical, Baroque, Woodwinds, Happy
10:20AM -- Jazz, Cool, Saxophone, Swing
11:20AM -- Classic Rock, Electric Guitar, Brooding
12:00PM -- Talk, confrontational, aggressive
02:00PM -- Hard Rock, energetic, distortion, aggressive

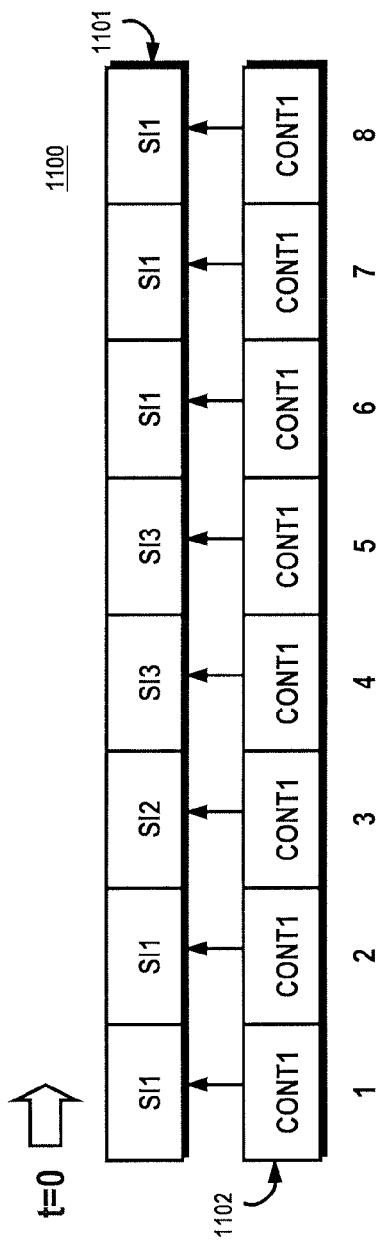

AUDIO MATCHING WITH SUPPLEMENTAL SEMANTIC AUDIO RECOGNITION AND REPORT GENERATION

RELATED APPLICATIONS

The present application is a continuation of U.S. patent application Ser. No. 13/725,021 titled "Audio decoding with supplemental semantic audio recognition and report generation" to Neuhauser et al., filed Dec. 21, 2012, which is a continuation-in-part of U.S. patent application Ser. No. 13/724,836 titled "Audio Processing Techniques for Semantic Audio Recognition and Report Generation" to Neuhauser et al., filed Dec. 21, 2012, the contents of which are incorporated by reference in their entirety herein.

TECHNICAL FIELD

The present disclosure relates to systems, apparatuses and processes for processing and communicating data, and, more specifically, to process audio portions of media data to read codes embedded in audio together with semantic audio features, and processing the codes and features for audience measurement research.

BACKGROUND INFORMATION

The use of audio encoding has been known in the art, and was partly pioneered by such companies as Arbitron for audience measurement research. Known techniques exploit the psychoacoustic masking effect of the human auditory system whereby certain sounds are humanly imperceptible when received along with other sounds. One such technique utilizing the psychoacoustic masking effect is described in U.S. Pat. No. 5,450,490 and U.S. Pat. No. 5,764,763 (Jensen et al.), both of which are incorporated by reference in their entirety herein, in which information is represented by a multiple-frequency code signal which is incorporated into an audio signal based upon the masking ability of the audio signal. The encoded audio signal is suitable for broadcast transmission and reception as well as for recording and reproduction. When received the audio signal is then processed to detect the presence of the multiple-frequency code signal. Sometimes, only a portion of the multiple-frequency code signal, e.g., a number of single frequency code components, inserted into the original audio signal are detected in the received audio signal. If a sufficient quantity of code components is detected, the information signal itself may be recovered.

While audio codes have proven to be effective at determining exposures to specific media, audio signature systems provide little to no semantic information regarding the media. As used herein below, the terms "semantic," "semantic information," "semantic audio signatures," and "semantic characteristics" refer to information processed from time, frequency and/or amplitude components of media audio, where these components may serve to provide generalized information regarding characteristics of the media, such as genre, instruments used, style, etc., as well as emotionally-related information that may be defined by a customizable vocabulary relating to audio component features (e.g., happy, melancholy, aggressive).

Some efforts have been made to semantically classify, characterize, and match music genres and are described in U.S. Pat. No. 7,003,515, titled "Consumer Item Matching Method and System," issued Feb. 21, 2006 and is incorporated by reference herein. However, these efforts often rely on humans to physically characterize music. Importantly, such techniques do not fully take advantage of audio signature information together with semantic information when analyzing audio content. Other efforts have been made to automatically label audio content for Music Information Retrieval Systems (MIR), such as those described in U.S. patent application Ser. No. 12/892,843, titled "Automatic labeling and Control of Audio Algorithms by Audio Recognition," filed Sep. 28, 2010, which is incorporated by reference in its entirety herein. However such systems can be unduly complex and also do not take full advantage of audio encoding technology together with semantic processing. As such, there is a need in the art to provide semantic information based on generic templates that may be used to identify semantic characteristics of audio, and to use the semantic characteristics in conjunction with audio signature technology. Additionally, there is a need to identify such characteristics for the purposes of audience measurement. Currently advertisers target listeners by using radio ratings. These rating are gathered by using encoding or audio matching systems. As listening/radio goes to a one-to-one experience (e.g. Pandora, Spotifiy, Songza, etc.), there is a need for advertisers to be able to target listeners by the style of music they listen, along with other related information. Semantic analysis can identify this information and provide useful tools for targeted advertisement. Furthermore, semantic information may be used to provide supplemental data to matched audio signature data.

SUMMARY

Accordingly, under one embodiment, a processor-based method is disclosed for producing supplemental information for media containing embedded audio codes, wherein the codes are read from an audio portion of the media, the method comprising the steps of receiving the audio codes at an input from a data network, where audio code data is received from a device during a first time period, and the audio code data representing a first characteristic of the audio portion. Semantic audio signature data is received at the input from the data network, the semantic audio signature data being received from the device for the first time period, wherein the semantic audio signature comprises at least one of temporal, spectral, harmonic and rhythmic features relating to a second characteristic of the media content. The semantic audio signature data is then successively associated to the audio codes in a processor for the first time period.

Under another embodiment, a system is disclosed for producing supplemental information for media containing embedded audio codes, wherein the codes are read from an audio portion of the media. The system comprises an input configured to receive the audio codes from a data network, the audio codes being received from a device during a first time period, wherein the audio codes representing a first characteristic of the audio portion. The input is further configured to receive semantic audio signature data from the data network, where the semantic audio signature data is received from the device for the first time period, wherein the semantic audio signature comprises at least one of temporal, spectral, harmonic and rhythmic features relating to a second characteristic of the media content. The system also comprises a processor, operatively coupled to the input, where the processor is configured to successively associate the semantic audio signature data to the audio codes in a processor for the first time period.

Under yet another embodiment, a processor-based method is disclosed for producing supplemental information for media containing embedded audio codes, wherein the codes are read from an audio portion of the media. The method comprises the steps of receiving the audio codes at an input from a data network, the audio codes being received from a device during a first time period, wherein the audio codes represent a first characteristic of audio portion; receiving semantic audio signature data at the input from the data network, said semantic audio signature data being received from the device for the first time period, wherein the semantic audio signature comprises at least one of temporal, spectral, harmonic and rhythmic features relating to a second characteristic of the media content; successively associating the semantic audio signature data to the audio codes in a processor for the first time period; and processing the associated semantic audio signature data and audio codes data to determine changing second characteristics in relation to the first characteristic.

Additional features and advantages of the various aspects of the present disclosure will become apparent from the following description of the preferred embodiments, which description should be taken in conjunction with the accompanying drawings.

BRIEF DESCRIPTION OF THE DRAWINGS

FIG. 11 illustrates an exemplary embodiment where audio codes are combined with semantic information to represent the semantic development of content; and FIG. 12 illustrates an exemplary embodiment, where semantic information is used to supplement audio signature information.

DETAILED DESCRIPTION

Figure 1:
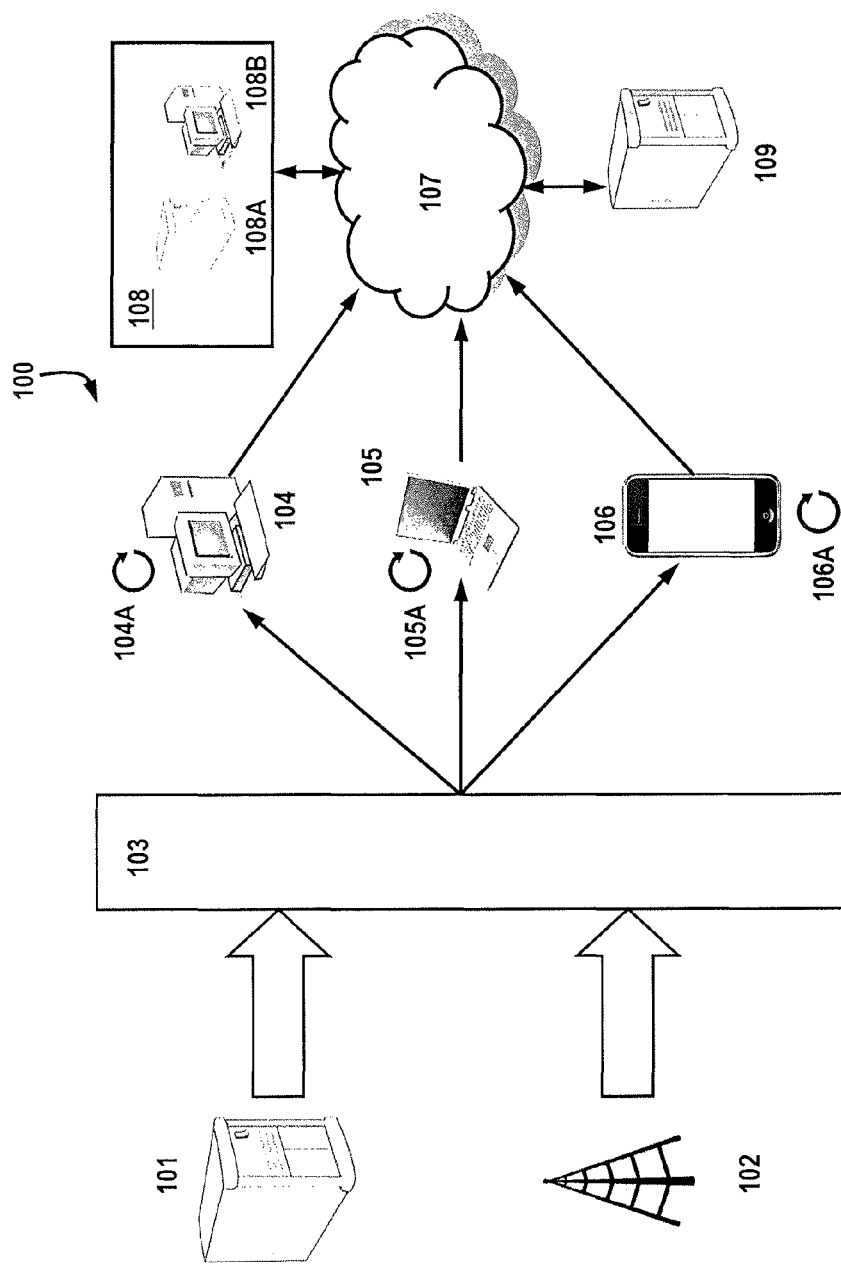
FIG. 1 is a block diagram illustrating a media measurement system under one exemplary embodiment.

FIG. 1 is an exemplary block diagram for a system 100, wherein media is provided from a broadcast source 102 (e.g., television, radio, etc.) and/or a data source 101 (e.g., server, cloud, etc.). The media is communicated to a media distribution network 103, which has the ability to pass through the broadcast and/or data to remote users or subscribers. Such media distribution networks 103 are well known and may include broadcast stations, satellite/cable, routers, servers, and the like.

The media may be received at one or more locations using any of a number of devices, including a personal computer 104, laptop 105, and smart phone or tablet 106. It is understood by those skilled in the art that the present disclosure is not limited strictly to devices 104-106, but may include any device configured to receive and/or record media including set-top-boxes, IPTV boxes, personal people meters, and the like. Additionally, devices, such as 104-106 may be equipped with one or more microphones (not shown) for transducing ambient audio for sampling and processing. Examples of such configurations may be found in U.S. patent application Ser. No. 13/341,272, titled "Apparatus, System And Method For Activating Functions In Processing Devices Using Encoded Audio And Audio Signatures," filed Dec. 30, 2011, and U.S. patent Ser. No. 13/341,365, titled "Activating Functions In Processing Devices Using Start Codes Embedded In Audio" filed Dec. 30, 2011, both of which are incorporated by reference in their entireties herein. Devices 104-106 may also be capable of reproducing media (104A-106A) on the device itself, where the media is transferred, downloaded, stored and/or streamed.

As each device 104-106 receives media from network 103 and/or reproduces media locally 104A-106A, the audio portion of the media is sampled and processed to form semantic audio signatures or templates, where resulting signature data is time stamped and transmitted to computer network 107 via wired or wireless means that are known in the art. In addition to semantic audio signature data, devices 104-106 may additionally transmit identification information that identifies the device and/or the user registered for the device. Under one embodiment, demographic information relating to the users of any of devices 104-106 may be transmitted as well. The semantic signatures are then stored in one or more remote locations or servers 109, where they are compared with audio signature templates provided from system 108 for semantic audio analysis. Under one exemplary embodiment, system 108 comprises at least one workstation 108B and server 108A, where audio signature templates are produced using any of the techniques described below, and forwarded to server(s) 109.

Figure 2:
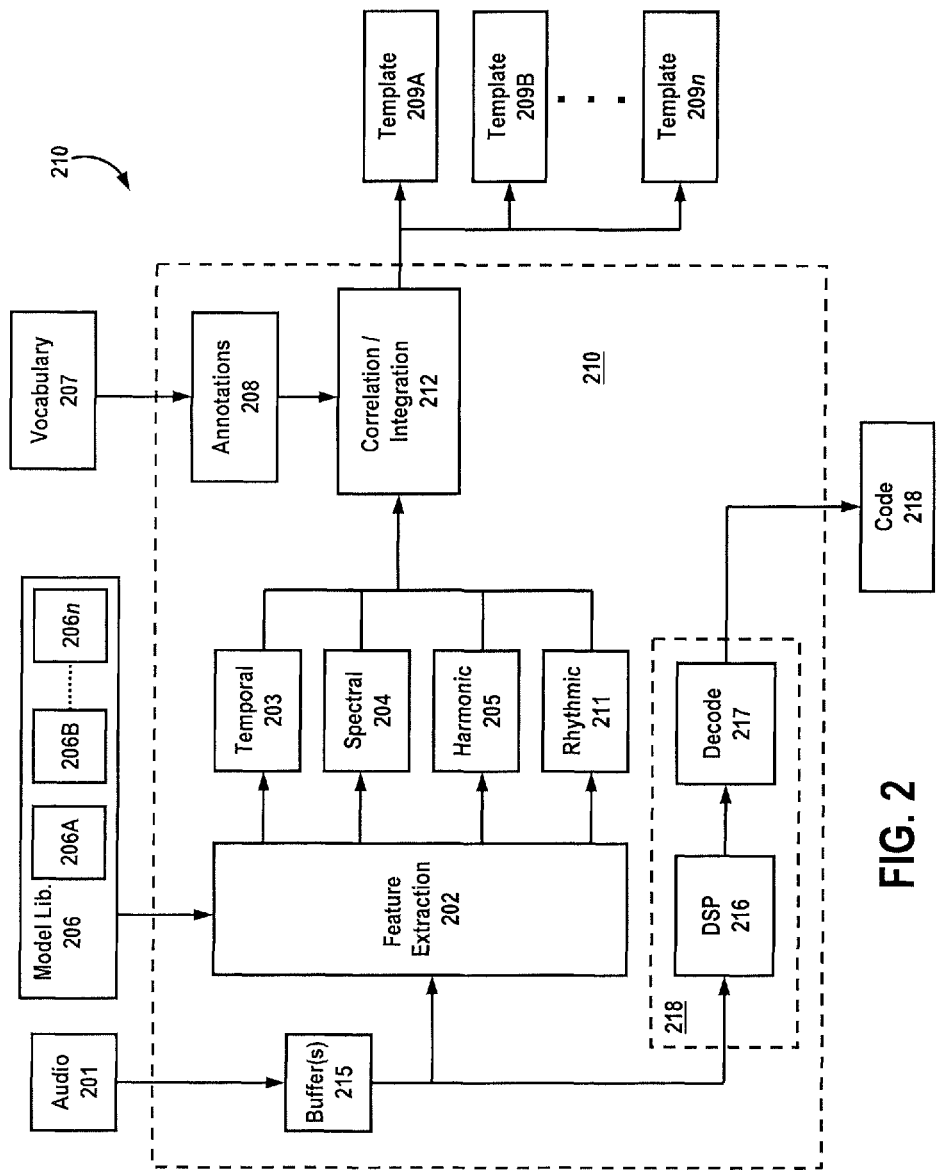
FIG. 2 illustrates one configuration for generating audio templates and reading audio code messages for use in extracting semantic features from audio under an exemplary embodiment.

Turning to FIG. 2, an exemplary configuration is shown for creating audio signature templates, where audio is fed into a processing device 210. It is understood that processing device 210 of FIG. 2 may be a dedicated workstation (e.g., 108B), or a portable devices, such as a smart phone, tablet, PC, etc. (104A-106A). Under one exemplary embodiment, audio 201 is sampled and stored in one or more buffers (215), where portions of the audio are processed and subjected to one or more feature extractions (202). Additionally, music portions stored in buffers 215 are subjected to signal processing for reading audio codes, which will be discussed in greater detail below.

With regard to feature extraction 202, while specific feature sets may vary, under a preferred embodiment, extracted feature sets in 204 may include energy-based features, spectral features, rhythmic features, temporal features and/or harmonic features. Depending on the feature set used, different models (206A-206n) may be called from a model library 206 memory in order to facilitate appropriate feature extraction. The feature extraction process is preferably controlled by software operative on a tangible medium, such as Psysound (http://psysound.wikidot.com/), CLAM (http://clam-project.org/), Marsyas (http://marsyas.sness-.net/), MIRToolbox (https://www.jyu.fi/hum/laitokset/musiikki/en/research/coe/materials/mirtoolbox), MA Toolbox (http://www.ofai.at/~elias.pampalk/ma/), Sound Description Toolbox, and/or any other suitable program or application, preferably compatible with the MATLAB and MPEG-7 format.

Feature extraction in 202 may advantageously be separated into multiple stages, where, for example, a first stage is responsible for processing temporal features 203, while a second stage is independently responsible for processing spectral features 204. Alternately or in addition, the stages may be separated by sample size, so that longer samples are processed for certain features before shorter sub-samples are processed for other features. This configuration may be advantageous for extracting features that are optimally detected over longer periods of time (e.g., 30 sec.), while reserving shorter segments (e.g., 5-6 sec., 100-200 ms) for other feature extraction processes. The varying sample sizes are also useful for separating audio segments that are independently processed for audio signature extraction 218, since audio signature extraction may rely on audio segments that are smaller than those required for certain templates.

For semantic processing, feature extraction 202 preferably includes pre-processing steps such as filtering and normalization to provide zero mean and unity variance. A first-order finite impulse response (FIR) filter may also be used to increase the relative energy of high-frequency spectrum. Frame blocking or "windowing" is then performed to segment the signal into statistically stationary blocks. The frame size (in terms of sample points) should be equal to the powers of 2 (such as 256, 512, 1024, etc) in order to make it suitable for transformation (e.g., FFT). Hamming window may be used to weight the pre-processed frames. In order to reduce the difference between neighboring frames, an overlap may be applied that is up to ⅔ of the original frame size. However, the greater the overlap, the more computational power is needed.

For temporal feature extraction 203, features are taken from the native domain of the audio signal, and without any preceding transformation. Temporal features include, but are not limited to, amplitude, power, and zero-crossing of the audio signal. Amplitude based features are processed directly from the amplitudes of a signal and represent the temporal envelope of an audio signal. Utilizing an audio waveform descriptor (e.g., MPEG-7), a compact description of the shape of a waveform may be formed by computing the minimum and maximum samples within non-overlapping portions of frames, resulting in a representation of the (preferably down-sampled) waveform envelope over time. Also, amplitude descriptors may be used by separating the audio signal into segments having low and high amplitudes according to an adaptive threshold. The duration, variation of duration and energy of segments crossing the thresholds would be recorded to form a specific descriptor for an audio segment. The amplitude descriptor could thus be used to characterize audio in terms of quiet and loud segments and to distinguish audio with characteristic waveform envelopes.

Generally speaking, the energy of a signal is the square of the amplitude of a waveform, and power may be represented are the transmitted energy of the signal per unit of time. Short Time Energy (STE) processing may be performed on the envelope of a signal to determine mean energy per frame. Thus, power may be represented as the mean square of a signal. Root-Mean-Square (RMS) may used to measure the power (or loudness, volume) of a signal over a frame. The global energy of a signal x can be computed by taking the root average of the square of the amplitude (RMS), expressed by $$x_{RMS} = \sqrt{\frac{1}{n}\sum_{i=1}^{n} x_i^2}.$$

Additionally, a temporal centroid (MPEG-7) may be used to determine a time average over the envelope of a signal to determine a point(s) in time where most of the energy of the signal is located on average. Such features are advantageous for distinguishing percussive from sustained sounds.

Continuing with the temporal features, the zero crossing rate (ZCR) may be used to measure signal noisiness and may be calculated by taking the mean and standard deviation of the number of signal values that cross the zero axis in each time window (i.e., sign changes of the waveform:

$$ZCR = \frac{1}{T}\sum_{t=m-T+1}^{m} \frac{|\text{sgn}(s_t) - \text{sgn}(s_{t-1})|}{2} w(m-t)$$

where T is the length of a time window, $s_t$ is the magnitude of the t-th time-domain sample and w is a rectangular window. The ZCR is advantageous in discriminating between noise, speech and music, where the ZCR would be greatest for noise, less for music, and lesser still for speech. Additional techniques, such as linear prediction zero crossing ratios could be used to determine a ratio of the zero crossing count of a waveform and the zero crossing count of the output of a linear prediction analysis filter. Such a feature would be advantageous in determining the degree of correlation in a signal.

While time domain features may provide useful data sets for semantic audio analysis, even more valuable information may be obtained from the spectral domain. To achieve this, a transformation should be performed on an audio signal to convert time domain features to the spectral domain wherein the existence and progression of periodic elements may be obtained, as well as pitch, frequency ranges, harmonics, etc. The most common and well-known transformation is the Fourier Transformation. For discrete digital signals, a Discrete Fourier Transformation (DFT) is generally known as $$X_k = \sum_{n=-0}^{N-1} x_n e^{-\frac{2\pi i}{N}nk} \quad k = 0, 1, \ldots, N-1$$

where $x_n$ are the time-based complex numbers, N is the number of values to transform and $X_k$ the resulting Fourier transformed complex numbers (or "Fourier coefficients").

The spectral domain (204) allows several extractions and computational time-invariant possibilities that bring out characteristic features and representations like spectrograms, energy deviations, frequency histograms and magnitudes of certain frequency range transformation that illustrate its influence on human perception of audio. In addition, time discrete Short Time Fourier Transformations (STFT) are preferably performed on short single segments of audio that is changing over time, resulting in a representation of frequency lots at a specific time, which may further be depicted in a time-frequency plot that may further be semantically processed using Bark scales. The Bark scale is a psycho acoustic scale that matches frequency range intervals to a specific number, and is based on the perception of pitch for human beings with respect to the amount of acoustic "feeling." It considers the almost-linear relation in lower frequency ranges as well as the logarithmic in higher ranges and its basic idea originates from frequency grouping and the "subdivision concept" referred to in the area of human hearing. As STFT may produce real and complex values, the real values may be used to process the distribution of the frequency components (i.e., spectral envelope) while the complex values may be used to process data relating to the phase of those components.

Under one embodiment, spectral features 204 are extracted under STFT, and, depending on the model used, may produce timbral texture features including spectral centroid, spectral rolloff, spectral flux, spectral flatness measures (SFM) and spectral crest factors (SCF). Such features are preferably extracted for each frame and then by taking the mean and standard deviation for each second. The sequence of feature vectors may be combined and/or collapsed into one or more vectors representing the entire signal by taking again the mean and standard deviation. A spectral centroid (SC) refers to the centroid, or "center of gravity" of the magnitude spectrum of the STFT and may be expressed as $$SC = \frac{\sum_{n=1}^{N} n A_t^n}{\sum_{n=1}^{N} A_t^n}$$

where $A_t^n$ is the magnitude of the spectrum at the t-th frame And the n-th frequency bin, and N is the total number of bins. As the centroid provides a measure of spectral shape, a higher spectral centroid will indicate a "brighter" audio texture.

The spectral rolloff is a spectral feature that estimates the amount of high frequency in a signal. More specifically, spectral rolloff may be defined as the frequency $k_t$ below which a certain fraction or percentage of total energy is contained. This fraction may be fixed by default to a specific number, such as 0.85 or 0.95, such as:

$$\sum_{n=1}^{k_t} A_t^n = 0.85 * \sum_{n=1}^{k_t} A_t^n$$

Spectral Flux (SF) estimates the amount of local spectral change and may be defined as a spectral feature representing the square of the difference between the normalized magnitudes of successive frames:

$$SF = \sum_{n=1}^{N} (a_t^n - a_{t-1}^n)^2$$

where a denotes the normalized magnitude of the spectrum that is preferably normalized for each frame. Because spectral flux represents the spectral variations between adjacent frames, it may be correlated to features such as articulation.

Tonalness is an audio feature that is useful in quantifying emotional perceptions, where joyful or peaceful melodies may be characterized as being more tonal (tone-like), while angry or aggressive melodies are characterized as being more atonal (noise-like). Features indicating tonalness include spectral flatness (SFL) and spectral crest factors (SCF), where SFL is expressed as the ratio between the geometric mean of the power spectrum and its arithmetic mean:

$$SFL = \frac{\left(\prod_{n \in B^k} A_t^n\right)^{1/N_k}}{\frac{1}{N_k} \sum_{n \in B^k}^{N} A_t^n}$$

and SCF is the ratio between the peak amplitude and the RMS amplitude:

$$SCF = \frac{\max_{n \in B^k} A_t^n}{\frac{1}{N_k} \sum_{n=1}^{N} A_t^n}$$

where $B^k$ denotes the kt-th frequency subband and $N_k$ is the number of bins in $B^k$. While any suitable number of subbands may be used, under one exemplary embodiment, 24 subbands are used for SFL and SCF extraction.

In addition to the above spectral features, it may be advantageous to also extract Mel-frequency cepstral coefficients (MFCCs) which denote coefficients of a discrete cosine transform (DCT) of each short-term log power spectrum expressed on a non-linear perceptually-related Mel-frequency scale to represent the formant peaks of the spectrum. Preferably, the mean and standard deviation of the first 13-20 MFCCs of each frame are taken. Since MFCCs average the spectral distribution in each subband, some of the relative spectral information may be lost. To compensate for this, and octave based spectral contrast (OBSC) may be used to capture the relative energy distribution of the harmonic components in the spectrum. OBSC considers the strength of spectral peaks and valleys in each sub-band separately. In general, spectral peaks correspond to harmonic components and spectral valleys correspond to non-harmonic components or noise in a music piece. Therefore, the contrast between spectral peaks and spectral valleys will reflect the spectral distribution.

Under another embodiment, spectral features may include the extraction of Daubechies wavelets coefficient histograms (DWCH), which is computed from the histograms of Daubechies wavelet coefficients at different frequency subbands with different resolutions, and is described in U.S. patent application Ser. No. 10/777,222, titled "Music Feature Extraction Using Wavelet Coefficient Histograms", filed Feb. 13, 2004, and is incorporated by reference in its entirety herein.

As different spectral features are extracted, they may be used or combined to form sensory features such as spectral dissonance, irregularity and inharmonicity. Spectral dissonance measures the noisiness of the spectrum, where notes that do not fall within a prevailing harmony are considered dissonant. Spectral dissonance may be estimated by computing the peaks of the spectrum and taking the average of all the dissonance between all possible pairs of peaks.

Irregularity measures the degree of variation of the successive peaks of the spectrum and may be computed by summing the square of the difference in amplitude between adjoining partials, or $$\frac{\sum_{n=1}^{N}(A_t^n - A_t^{n+1})^2}{\sum_{n=1}^{N} A_t^n * A_t^n}$$

Alternately, irregularity may be measured using Krimphoff's method, which defines irregularity as the sum of amplitude minus the mean of the preceding, current, and next, amplitude:

$$\sum_{n=2}^{N-1}\left|A_t^n - \frac{A_t^{n-1} + A_t^n + A_t^{n+1}}{3}\right|$$

Inharmonicity estimates the amount of partials that depart from multiples of the fundamental frequency. It is computed as an energy weighted divergence of the spectral components from the multiple of the fundamental frequency, or $$\frac{2}{f_0} \frac{\sum_{n=1}^{N}|f_n - nf_0|(A_t^n)^2}{\sum_{n=1}^{N}(A_t^n)^2}$$

where $f_n$ is the n-th harmonic of the fundamental frequency $f_0$. The inharmonicity represents the divergence of the signal spectral components from a purely harmonic signal. The resulting value ranges from 0 (purely harmonic) to 1 (inharmonic)

Still referring to FIG. 2, harmonic feature extraction 205 may also be performed to extract features from the sinusoidal harmonic modeling of an audio signal. Harmonic modeling may be particularly advantageous for semantic analysis as natural/musical sounds are themselves harmonic, consisting of a series of frequencies at multiple ratios of the lowest frequency, or fundamental frequency $f_0$. Under one embodiment, a plurality of pitch features (e.g., salient pitch, chromagram center) and tonality features (e.g., key clarity, mode, harmonic change) are extracted. The perceived fundamental frequency of a time frame (e.g., 50 ms, 50% overlap) may be calculated using a multi-pitch detection algorithm by decomposing an audio waveform into a plurality of frequency bands (e.g., one below and one above 1 kHz), computing an autocorrelation function of the envelope in each subband, and producing pitch estimates by selecting the peaks from the sum of the plurality of autocorrelation functions. The calculation corresponding to the highest peak is deemed the "salient pitch."

Alternately or in addition, a pitch class profile or wrapped chromagram may be computed for each frame (e.g., 100 ms, ⅛ overlap), where the centroid of the chromagram is selected as the fundamental frequency, or chromagram centroid. A wrapped chromagram may project a frequency spectrum onto 12 bins representing 12 semitones (or chroma) of a musical octave (e.g., 440 Hz (C4) and 880 Hz (C5) would be mapped to chroma "C"). By comparing a chromagram to the 24 major and minor key profiles, key detection may be performed to estimate the strength of a frame compared to each key (e.g., C major). The key associated with the greatest strength would be identified as the key strength or key clarity. The difference between the best major key and best minor key in strength may be used as an estimate of music mode, which may be used to characterize a fixed arrangement of the diatonic tones of an octave. The numerical value would be indicative of audio content being more major, and thus having a higher value.

Harmonic changes (e.g., chord changes) may also be determined using a Harmonic Change Detection Function (HCDF) algorithm modeled for equal tempered pitch space for projecting collections of pitches as tonal centroid points in a 6-D space. The HCDF system comprises a constant-Q spectral analysis at the lowest level, followed by a 12-semitone chromagram decomposition. A harmonic centroid transform is then applied to the chroma vectors which is then smoothed with a Gaussian filter before a distance measure is calculated. High harmonic change would indicate large differences in harmonic content between consecutive frames. Short term features could be aggregated by taking mean and standard deviation. Additional information on HCDF techniques may be found in Harte et al., "Detecting Harmonic Changes in Musical Audio," AMCMM '06 Proceedings of the 1st ACM workshop on Audio and music computing multimedia, pp. 21-26 (2006).

Alternately or in addition, a pitch histogram may be calculated using Marsyas toolbox, where pluralities of features may be extracted from it, including tonic, main pitch class, octave range of dominant pitch, main tonal interval relation, and overall pitch strength. Modules such as Psysound may be used to compare multiple pitch-related features including the mean, standard deviation, skewness and kurtosis of the pitch and pitch strength time series.

Additionally, rhythmic features 211 may be extracted from the audio signal. One beat detector structures may comprise a filter bank decomposition, followed by an envelope extraction step, followed by a periodicity detection algorithm to detect the lag at which the signal's envelope is most similar to itself. The process of automatic beat detection may be thought of as resembling pitch detection with larger periods (approximately 0.5 s to 1.5 s for beat compared to 2 ms to 50 ms for pitch). The calculation of rhythmic features may be based on the wavelet transform (WT), where WT provides high time resolution and low-frequency resolution for high frequencies, and low time and high-frequency resolution for low frequencies. The discrete wavelet transform (DWT) is a special case of the WT that provides a compact representation of the signal in time and frequency that can be computed efficiently using a fast, pyramidal algorithm related to multi-rate filterbanks.

The feature set for representing rhythm structure may be based on detecting the most salient periodicities of the signal. The signal may be first decomposed into a number of octave frequency bands using the DWT. Following this decomposition, the time domain amplitude envelope of each band is extracted separately. This is achieved by applying full-wave rectification, low pass filtering, and down-sampling to each octave frequency band. After mean removal, the envelopes of each band are then summed together and the autocorrelation of the resulting sum envelope is computed. The dominant peaks of the autocorrelation function correspond to the various periodicities of the signal's envelope. These peaks are accumulated over the whole sound file into a beat histogram where each bin corresponds to the peak lag, i.e., the beat period in beats-per-minute (BPM). The amplitude of each peak is preferably added to the beat histogram so that, when the signal is very similar to itself (i.e., strong beat) the histogram peaks will be higher. The beat histogram may be processed to generate additional features, such as beat strength, amplitude and period of the first and second peaks of the beat histogram, and the ratio of the strength of the two peaks in terms of BPMs.

Rhythm patterns may also be extracted by calculating a time-invariant representation for the audio signal to provide data on how strong and fast beats are played within the respective frequency bands. The amplitude modulation of the loudness sensation per critical-band for each audio frame sequence (e.g., 6 sec) is calculated using a FFT. Amplitude modulation coefficients may be weighted based on the psychoacoustic model of the fluctuation strength. The amplitude modulation of the loudness has different effects on human hearing sensations depending on the modulation frequency. The sensation of fluctuation strength tends to be most intense around 4 Hz and gradually decreases up to a modulation frequency of 15 Hz. For each frequency band, multiple values for modulation frequencies between specific ranges (e.g., 0 and 10 Hz) are obtained to indicate fluctuation strength. To distinguish certain rhythm patterns better and to reduce irrelevant information, gradient and Gaussian filters may be applied. To obtain a single representation for each audio signal 201 input into 210, the median of the corresponding sequences may be calculated to produce an X by Y matrix. A rhythm pattern may be further integrated into a multi-bin (e.g., 60-bin) rhythm histogram by summing amplitude modulation coefficients across critical bands. The mean of the rhythm histogram may be regarded as an estimate of the average tempo.

Rhythm strength may be calculated as the average onset strength of an onset detection curve using algorithmic processes described in Anssi Klapuri, "Sound Onset Detection by Applying Psychoacoustic Knowledge," Proceedings, 1999 IEEE International Conference on Acoustics, Speech, and Signal Processing, vol. 6, pp. 3089-3092 (1999), where the "onset" refers to the start of each musical event (e.g., note). Rhythm regularity and rhythm clarity may be computed by performing autocorrelation on the onset detection curve. If a music segment has an obvious and regular rhythm, the peaks of the corresponding autocorrelation curve will be obvious and strong as well. Onset frequency, or event density, is calculated as the number of onset notes per second, while tempo may be estimated by detecting periodicity from the onset detection curve.

Still referring to FIG. 2, each of the temporal 203, spectral 204, harmonic 205, and rhythmic 211 features are correlated to the audio 201 in 212 to arrange a base set of features. These features may be define in system 210 using vocabulary database 207 that contains a lexicography of various and different words/phrases used to tag the semantic information contained in 212. Under a preferred embodiment, vocabulary 207 is customizable by an operator of system 210, where specific words, phrases and descriptions may be entered, depending on the need and audio features involved. For example, in a very simple configuration, the vocabulary may comprise a few genres, styles, and emotive descriptors, where descriptive words/phrases (tags) are mapped to respectively extracted features. In one embodiment, descriptive tags may be mapped to multiple extracted features. Such a configuration is advantageous in instances where multiple variations of a specific feature (e.g., beat histogram) may be attributable to a single tag (e.g., genre, emotive descriptor).

In another embodiment, entries in the vocabulary are subjected to an annotation process 208 which is advantageous for creating more complex multiclass, multi-tag arrangements and classifications, where tags are arranged in a class, sub-class hierarchy. A class-conditional distribution may then be formed during a training process to attribute tags to extracted features that are positively associated with that tag. The tags may then be arranged in a rank order for later processing and identification using techniques such as Byes' rule, k-nearest neighbor, and fuzzy classification, among others. Once extracted features are tagged and integrated in 212, a plurality of templates 209A-209n are formed comprising one or more tagged extracted features, and stored for later comparison.

Figure 3:
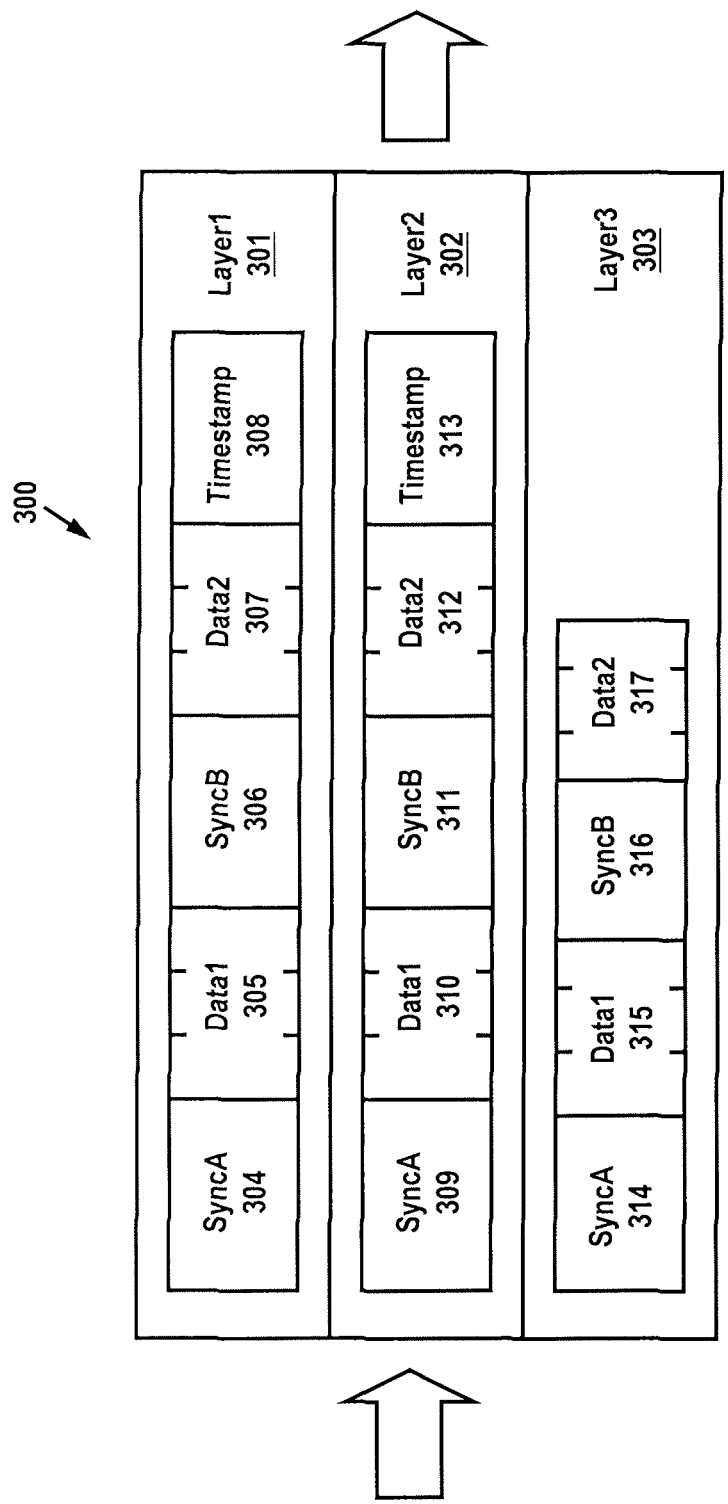
FIG. 3 is an exemplary message structure for decoding messages in one embodiment.

In addition to semantic feature extraction, processing device 210 may be suitably equipped with an audio decoder 218, which processes audio in a digital signal processor (DSP) 216 in order to identify code that are subsequently read out in decoder 217. The resulting code 218 is transmitted externally and may be used to form a message identifying content, broadcasters, content provider, and the like. FIG. 3 illustrates a message 300 that may be embedded/encoded into an audio signal (e.g., 201). In this embodiment, message 300 includes multiple layers that are inserted by encoders in a parallel format. Suitable encoding techniques are disclosed in U.S. Pat. No. 6,871,180, titled "Decoding of Information in Audio Signals," issued Mar. 22, 2005, which is assigned to the assignee of the present application, and is incorporated by reference in its entirety herein. Other suitable techniques for encoding data in audio data are disclosed in U.S. Pat. No. 7,640,141 to Ronald S. Kolessar and U.S. Pat. No. 5,764,763 to James M. Jensen, et al., which are also assigned to the assignee of the present application, and which are incorporated by reference in their entirety herein. Other appropriate encoding techniques are disclosed in U.S. Pat. No. 5,579,124 to Aijala, et al., U.S. Pat. Nos. 5,574,962, 5,581,800 and 5,787,334 to Fardeau, et al., and U.S. Pat. No. 5,450,490 to Jensen, et al., each of which is assigned to the assignee of the present application and all of which are incorporated herein by reference in their entirety.

When utilizing a multi-layered message, one, two or three layers may be present in an encoded data stream, and each layer may be used to convey different data. Turning to FIG. 3, message 300 includes a first layer 301 containing a message comprising multiple message symbols. During the encoding process, a predefined set of audio tones (e.g., ten) or single frequency code components are added to the audio signal during a time slot for a respective message symbol. At the end of each message symbol time slot, a new set of code components is added to the audio signal to represent a new message symbol in the next message symbol time slot. At the end of such new time slot another set of code components may be added to the audio signal to represent still another message symbol, and so on during portions of the audio signal that are able to psychoacoustically mask the code components so they are inaudible. Preferably, the symbols of each message layer are selected from a unique symbol set. In layer 301, each symbol set includes two synchronization symbols (also referred to as marker symbols) 304, 306, a number of data symbols 305, 307, and time code symbols 308. Time code symbols 308 and data symbols 305, 307 are preferably configured as multiple-symbol groups.

The second layer 302 of message 300 is illustrated having a similar configuration to layer 301, where each symbol set includes two synchronization symbols 309, 311, a larger number of data symbols 310, 312, and time code symbols 313. The third layer 303 includes two synchronization symbols 314, 316, and a larger number of data symbols 315, 317. The data symbols in each symbol set for the layers (301-303) should preferably have a predefined order and be indexed (e.g., 1, 2, 3). The code components of each symbol in any of the symbol sets should preferably have selected frequencies that are different from the code components of every other symbol in the same symbol set. Under one embodiment, none of the code component frequencies used in representing the symbols of a message in one layer (e.g., Layer1 301) is used to represent any symbol of another layer (e.g., Layer2 302). In another embodiment, some of the code component frequencies used in representing symbols of messages in one layer (e.g., Layer3 303) may be used in representing symbols of messages in another layer (e.g., Layer1 301). However, in this embodiment, it is preferable that "shared" layers have differing formats (e.g., Layer3 303, Layer1 301) in order to assist the decoder in separately decoding the data contained therein.

Sequences of data symbols within a given layer are preferably configured so that each sequence is paired with the other and is separated by a predetermined offset. Thus, as an example, if data 305 contains code 1, 2, 3 having an offset of "2", data 307 in layer 301 would be 3, 4, 5. Since the same information is represented by two different data symbols that are separated in time and have different frequency components (frequency content), the message may be diverse in both time and frequency. Such a configuration is particularly advantageous where interference would otherwise render data symbols undetectable. Under one embodiment, each of the symbols in a layer have a duration (e.g., 0.2-0.8 sec) that matches other layers (e.g., Layer1 301, Layer2 302). In another embodiment, the symbol duration may be different (e.g., Layer 2 302, Layer 3 303). During a decoding process, the decoder detects the layers and reports any predetermined segment that contains a code.

Figure 4:
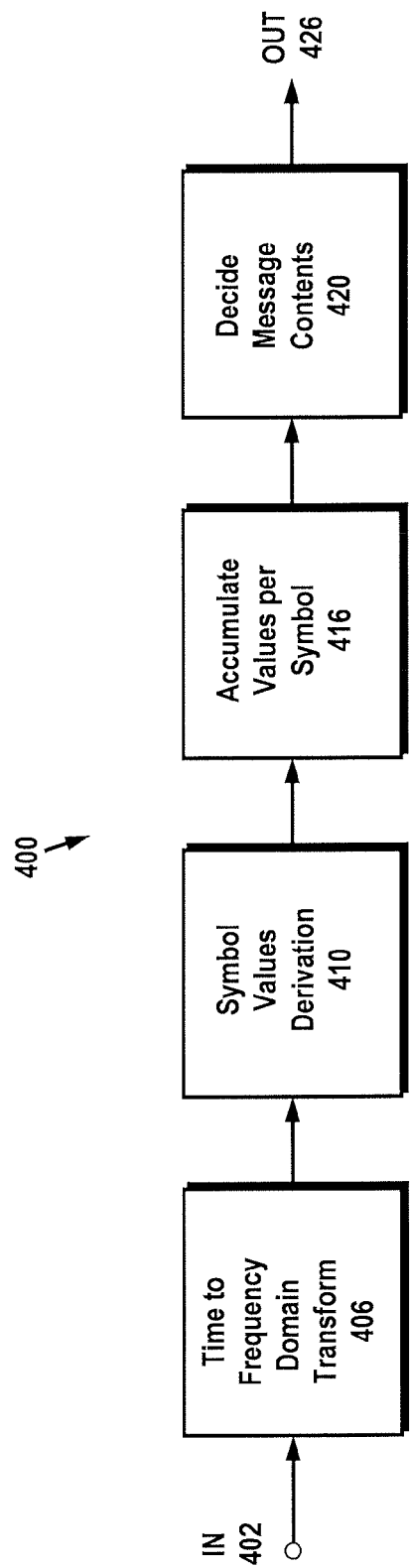
FIG. 4 illustrates an exemplary decoding process under one embodiment.

FIG. 4 is a functional block diagram illustrating a decoding apparatus (218) under one embodiment. An audio signal which may be encoded as described hereinabove with a plurality of code symbols, is received at an input 402. The received audio signal may be from streaming media, broadcast, otherwise communicated or reproduced signal, or a signal reproduced from storage in a device. It may be a direct coupled or an acoustically coupled signal. From the following description in connection with the accompanying drawings, it will be appreciated that decoder 400 is capable of detecting codes in addition to those arranged in the formats disclosed hereinabove.

For received audio signals in the time domain, decoder 400 transforms such signals to the frequency domain by means of function 406. Function 406 preferably is performed by a digital processor implementing a fast Fourier transform (FFT) although a direct cosine transform, a chirp transform or a Winograd transform algorithm (WFTA) may be employed in the alternative. Any other time-to-frequency-domain transformation function providing the necessary resolution may be employed in place of these. It will be appreciated that in certain implementations, function 406 may also be carried out by filters, by a application specific integrated circuit, or any other suitable device or combination of devices. Function 406 may also be implemented by one or more devices which also implement one or more of the remaining functions illustrated in FIG. 3.

The frequency domain-converted audio signals are processed in a symbol values derivation function 410, to produce a stream of symbol values for each code symbol included in the received audio signal. The produced symbol values may represent, for example, signal energy, power, sound pressure level, amplitude, etc., measured instantaneously or over a period of time, on an absolute or relative scale, and may be expressed as a single value or as multiple values. Where the symbols are encoded as groups of single frequency components each having a predetermined frequency, the symbol values preferably represent either single frequency component values or one or more values based on single frequency component values. Function 410 may be carried out by a digital processor, such as a DSP (216) which advantageously carries out some or all of the other functions of decoder 400. However, the function 410 may also be carried out by an application specific integrated circuit, or by any other suitable device or combination of devices, and may be implemented by apparatus apart from the means which implement the remaining functions of the decoder 400.

The stream of symbol values produced by the function 410 are accumulated over time in an appropriate storage device on a symbol-by-symbol basis, as indicated by function 416. In particular, function 416 is advantageous for use in decoding encoded symbols which repeat periodically, by periodically accumulating symbol values for the various possible symbols. For example, if a given symbol is expected to recur every X seconds, the function 416 may serve to store a stream of symbol values for a period of nX seconds (n>1), and add to the stored values of one or more symbol value streams of nX seconds duration, so that peak symbol values accumulate over time, improving the signal-to-noise ratio of the stored values. Function 416 may be carried out by a digital processor, such as a DSP, which advantageously carries out some or all of the other functions of decoder 400. However, the function 410 may also be carried out using a memory device separate from such a processor, or by an application specific integrated circuit, or by any other suitable device or combination of devices, and may be implemented by apparatus apart from the means which implements the remaining functions of the decoder 400.

The accumulated symbol values stored by the function 416 are then examined by the function 420 to detect the presence of an encoded message and output the detected message at an output 426. Function 420 can be carried out by matching the stored accumulated values or a processed version of such values, against stored patterns, whether by correlation or by another pattern matching technique. However, function 420 advantageously is carried out by examining peak accumulated symbol values and their relative timing, to reconstruct their encoded message. This function may be carried out after the first stream of symbol values has been stored by the function 416 and/or after each subsequent stream has been added thereto, so that the message is detected once the signal-to-noise ratios of the stored, accumulated streams of symbol values reveal a valid message pattern.

Figure 5:
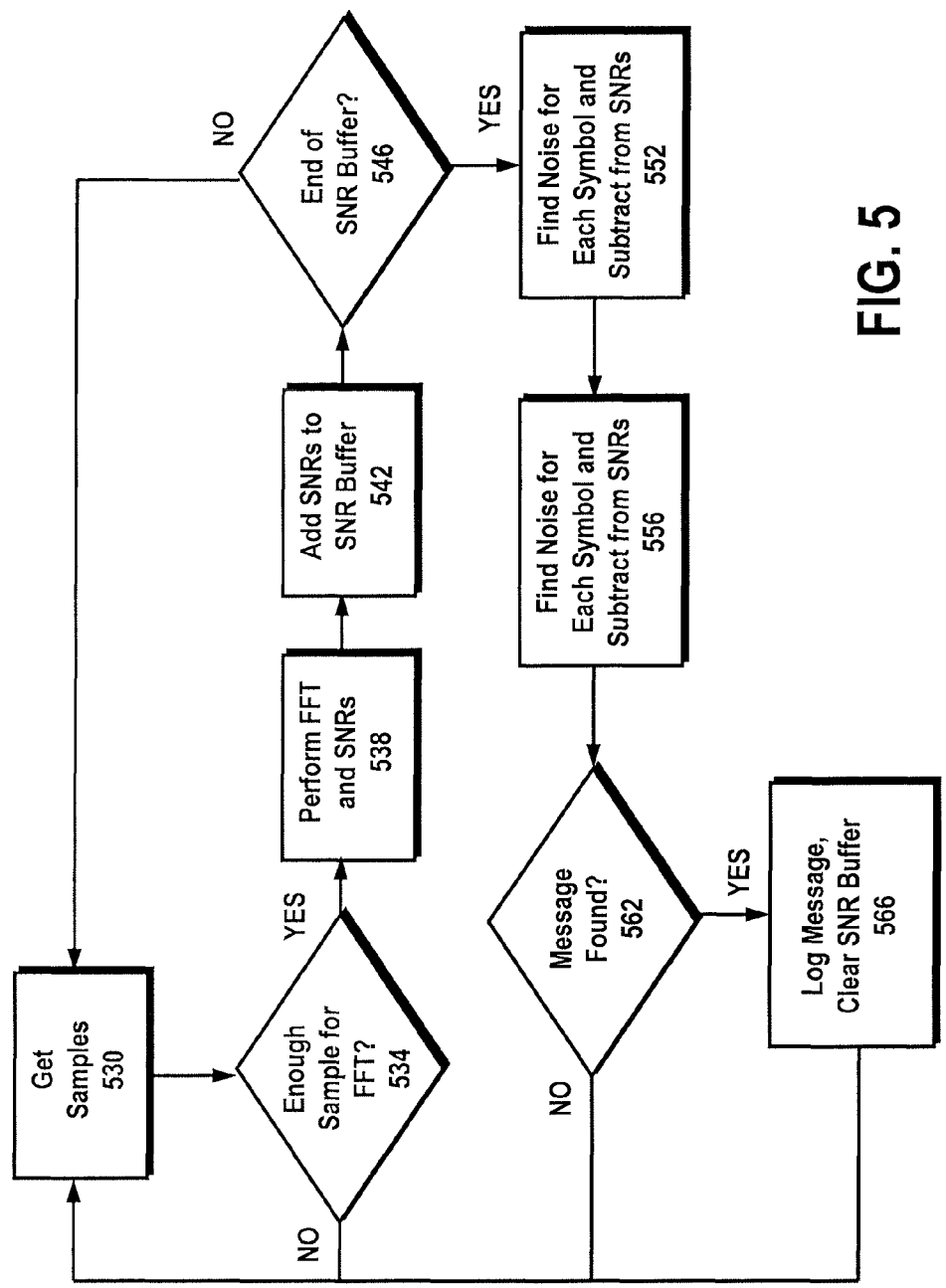
FIG. 5 is an exemplary flow chart illustrating a methodology for retrieving an information code from an encoded audio signal.

FIG. 5 is a flow chart for a decoder according to one advantageous embodiment of the invention implemented by means of a DSP. Step 530 is provided for those applications in which the encoded audio signal is received in analog form, for example, where it has been picked up by a microphone or an RF receiver. The decoder of FIG. 5 is particularly well adapted for detecting code symbols each of which includes a plurality of predetermined frequency components, e.g. ten components, within a frequency range of 1000 Hz to 3000 Hz. In this embodiment, the decoder is designed specifically to detect a message having a specific sequence wherein each symbol occupies a specified time interval (e.g., 0.5 sec). In this exemplary embodiment, it is assumed that the symbol set consists of twelve symbols, each having ten predetermined frequency components, none of which is shared with any other symbol of the symbol set. It will be appreciated that the FIG. 5 decoder may readily be modified to detect different numbers of code symbols, different numbers of components, different symbol sequences and symbol durations, as well as components arranged in different frequency bands.

In order to separate the various components, the DSP repeatedly carries out FFTs on audio signal samples falling within successive, predetermined intervals. The intervals may overlap, although this is not required. In an exemplary embodiment, ten overlapping FFT's are carried out during each second of decoder operation. Accordingly, the energy of each symbol period falls within five FFT periods. The FFT's are preferably windowed, although this may be omitted in order to simplify the decoder. The samples are stored and, when a sufficient number are thus available, a new FFT is performed, as indicated by steps 534 and 538.

In this embodiment, the frequency component values are produced on a relative basis. That is, each component value is represented as a signal-to-noise ratio (SNR), produced as follows. The energy within each frequency bin of the FFT in which a frequency component of any symbol can fall provides the numerator of each corresponding SNR. Its denominator is determined as an average of adjacent bin values. For example, the average of seven of the eight surrounding bin energy values may be used, the largest value of the eight being ignored in order to avoid the influence of a possible large bin energy value which could result, for example, from an audio signal component in the neighborhood of the code frequency component. Also, given that a large energy value could also appear in the code component bin, for example, due to noise or an audio signal component, the SNR is appropriately limited. In this embodiment, if SNR>6.0, then SNR is limited to 6.0, although a different maximum value may be selected.

The ten SNR's of each FFT and corresponding to each symbol which may be present, are combined to form symbol SNR's which are stored in a circular symbol SNR buffer, as indicated in step 542. In certain embodiments, the ten SNR's for a symbol are simply added, although other ways of combining the SNR's may be employed. The symbol SNR's for each of the twelve symbols are stored in the symbol SNR buffer as separate sequences, one symbol SNR for each FFT for 50 µl FFT's. After the values produced in the 50 FFT's have been stored in the symbol SNR buffer, new symbol SNR's are combined with the previously stored values, as described below.

When the symbol SNR buffer is filled, this is detected in a step 546. In certain advantageous embodiments, the stored SNR's are adjusted to reduce the influence of noise in a step 552, although this step may be optional. In this optional step, a noise value is obtained for each symbol (row) in the buffer by obtaining the average of all stored symbol SNR's in the respective row each time the buffer is filled. Then, to compensate for the effects of noise, this average or "noise" value is subtracted from each of the stored symbol SNR values in the corresponding row. In this manner, a "symbol" appearing only briefly, and thus not a valid detection, is averaged out over time.

After the symbol SNR's have been adjusted by subtracting the noise level, the decoder attempts to recover the message by examining the pattern of maximum SNR values in the buffer in a step 556. In certain embodiments, the maximum SNR values for each symbol are located in a process of successively combining groups of five adjacent SNR's, by weighting the values in the sequence in proportion to the sequential weighting (6 10 10 10 6) and then adding the weighted SNR's to produce a comparison SNR centered in the time period of the third SNR in the sequence. This process is carried out progressively throughout the fifty FFT periods of each symbol. For example, a first group of five SNR's for a specific symbol in FFT time periods (e.g., 1-5) are weighted and added to produce a comparison SNR for a specific FFT period (e.g., 3). Then a further comparison SNR is produced using the SNR's from successive FFT periods (e.g., 2-6), and so on until comparison values have been obtained centered on all FFT periods. However, other means may be employed for recovering the message. For example, either more or less than five SNR's may be combined, they may be combined without weighing, or they may be combined in a non-linear fashion.

After the comparison SNR values have been obtained, the decoder examines the comparison SNR values for a message pattern. Under a preferred embodiment, the synchronization ("marker") code symbols are located first. Once this information is obtained, the decoder attempts to detect the peaks of the data symbols. The use of a predetermined offset between each data symbol in the first segment and the corresponding data symbol in the second segment provides a check on the validity of the detected message. That is, if both markers are detected and the same offset is observed between each data symbol in the first segment and its corresponding data symbol in the second segment, it is highly likely that a valid message has been received. If this is the case, the message is logged, and the SNR buffer is cleared 566. It is understood by those skilled in the art that decoder operation may be modified depending on the structure of the message, its timing, its signal path, the mode of its detection, etc., without departing from the scope of the present invention. For example, in place of storing SNR's, FFT results may be stored directly for detecting a message.

Figure 6A:
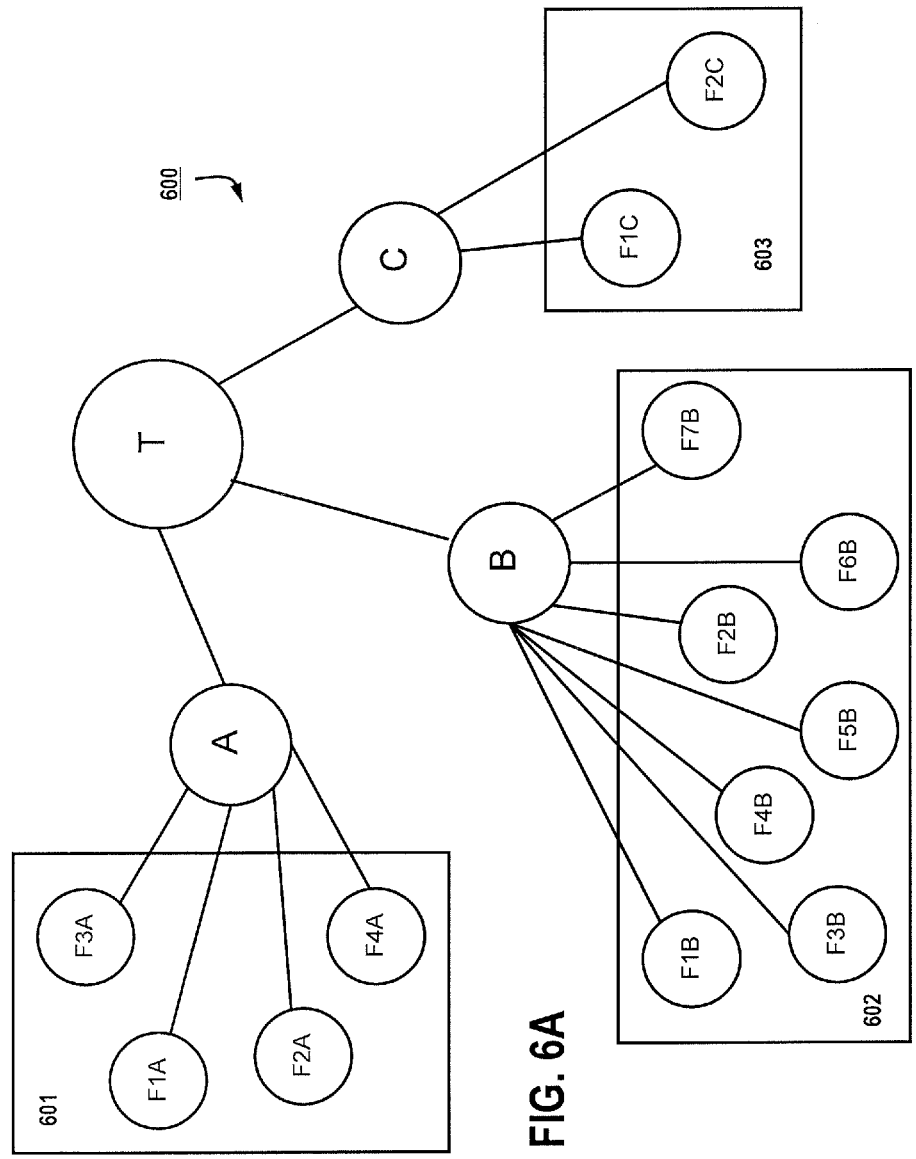
FIG. 6A illustrates audio feature template arrangement under another exemplary embodiment.

Returning to semantic audio information extraction, FIG. 6A provides one example of a template arrangement 600, where tag T is comprised of 3 extracted audio features tagged as A-C. In this example, tagged feature A is associated with extracted features F1A-F4A 601, tagged feature B is associated with features F1B-F7B 602, and tagged feature C is associated with extracted features F1C-F2C 603. In each of these (601-603), extracted features may be values associated with the temporal 603, spectral 604, harmonic 605 and/or rhythmic 611 processing performed in FIG. 2. Under a preferred embodiment, certain individual extracted features 601-603 may be duplicated among the tags (A-C), to simplify the datasets used for a tree hierarchy.

Figure 6B:
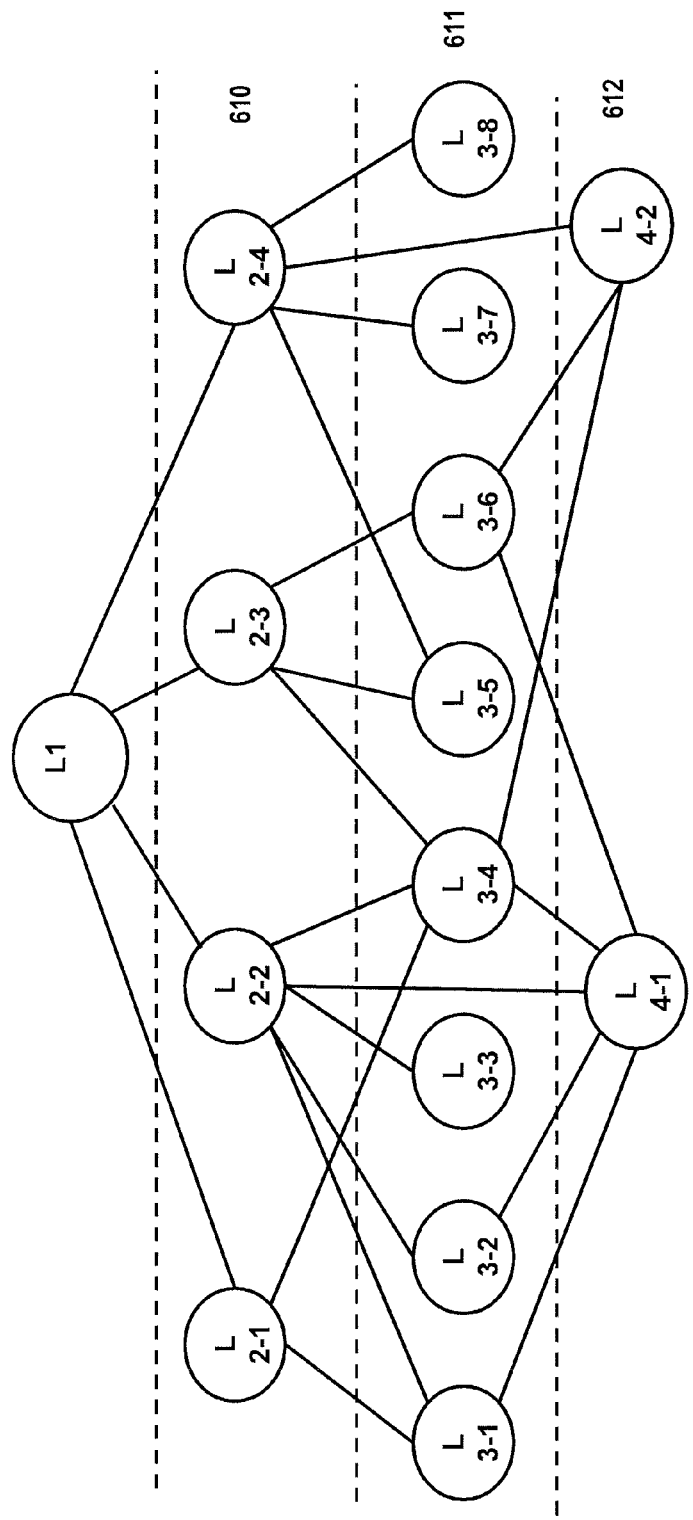
FIG. 6B illustrates an audio feature template hierarchy under another exemplary embodiment.

FIG. 6B exemplifies one possible hierarchy arrangement where a global tag L1 represents the overall characteristics of extracted features and is labeled according to an assigned vocabulary. In this example, global tag L1 is characterized by four lower-level (610-612) tags (L2-1 through L2-4). Each of these lower-level tags may represent different features as a class that may be extracted from different aspects of audio (e.g., temporal, spectral, harmonic, rhythmic), which may be correlated and cross-correlated as shown in FIG. 3B. Below level 610, is a first sub-level 611 provides additional features, followed by a second sub-level 612 having further additional features that also are correlated and/or cross-correlated. It is understood by those skilled in the art that the tags and level hierarchies may be arranged in a myriad of ways, depending on the needs of the designer. For example, under an alternate embodiment, global tags may represent any of genre, emotional descriptor, instrument, song style, etc. Mid-level features may be associated with lower-level tags representing rhythmic features, pitch and harmony. A sub-level may include tags representing low-level features such as timbre and temporal features. Tags may had additional annotations associated with their class as well, e.g., rhythm (sub: beat histogram, BPM), pitch (sub: salient pitch, chromagram center), timbre (sub: ZCR, SC, SFL, MFCC, DWCH). Moreover, the hierarchical arrangement may be configured to separately take into consideration short-term audio features (e.g., timbre) and long-term audio features (e.g., temporal, pitch, harmony).

The arrangement may be useful in taking advantage of numerous classification techniques for forming and identifying semantic audio information. Under one embodiment, each audio frame is classified separately, and classification results are combined over an analysis segment to get a global classification result. Under another embodiment, the temporal relationship between frames may be taken into account. One exemplary classifier is a k-Nearest Neighbor Classifier, where the distance between tested tagged feature vectors and the training vectors is measured, and the classification is identified according to the k nearest training vectors. A Gaussian Mixture Model may be used to obtain distributions of feature values for specific musical characteristics, and may be modeled as a weighted sum of Gaussian density functions. This mixture may be used to determine the probability of a test feature vector as belonging to a particular audio characteristic.

In one embodiment, tree-based vector quantization may be used to model discrimination function between classes defined by a set of labeled codebook vectors. A quantization tree is formed to partition the feature space into regions with maximally different tag/class populations. The tree may used to form a histogram template for an audio characteristic and the classification may be done by matching template histograms of training data to the histograms of the test data. The classification can alternately be done with a feed-forward neural network that is trained with examples from different classes so as to map the high-dimensional space of feature vectors onto the different classes. A Linear Discriminant Analysis (LDA) may be used to find a linear transformation for the feature vectors that best discriminates them (e.g., using Euclidean distance) among classes.

In an alternate embodiment, a binary classification approach may be done using Support Vector Machines (SVMs), where feature vectors are first non-linearly mapped into a new feature space and a hyperplane is then searched in the new feature space to separate the data points of the classes with a maximum margin. The SVM may be extended into multi-class classification with one-versus-the-rest, pairwise comparison, and multi-class objective functions. In yet another embodiment, a Hidden Markov Model (HMM) may be used to account for the temporal order of frames, where the HMM may consist of several GMMs and the probabilities describing the transitions between them.

Figure 7:
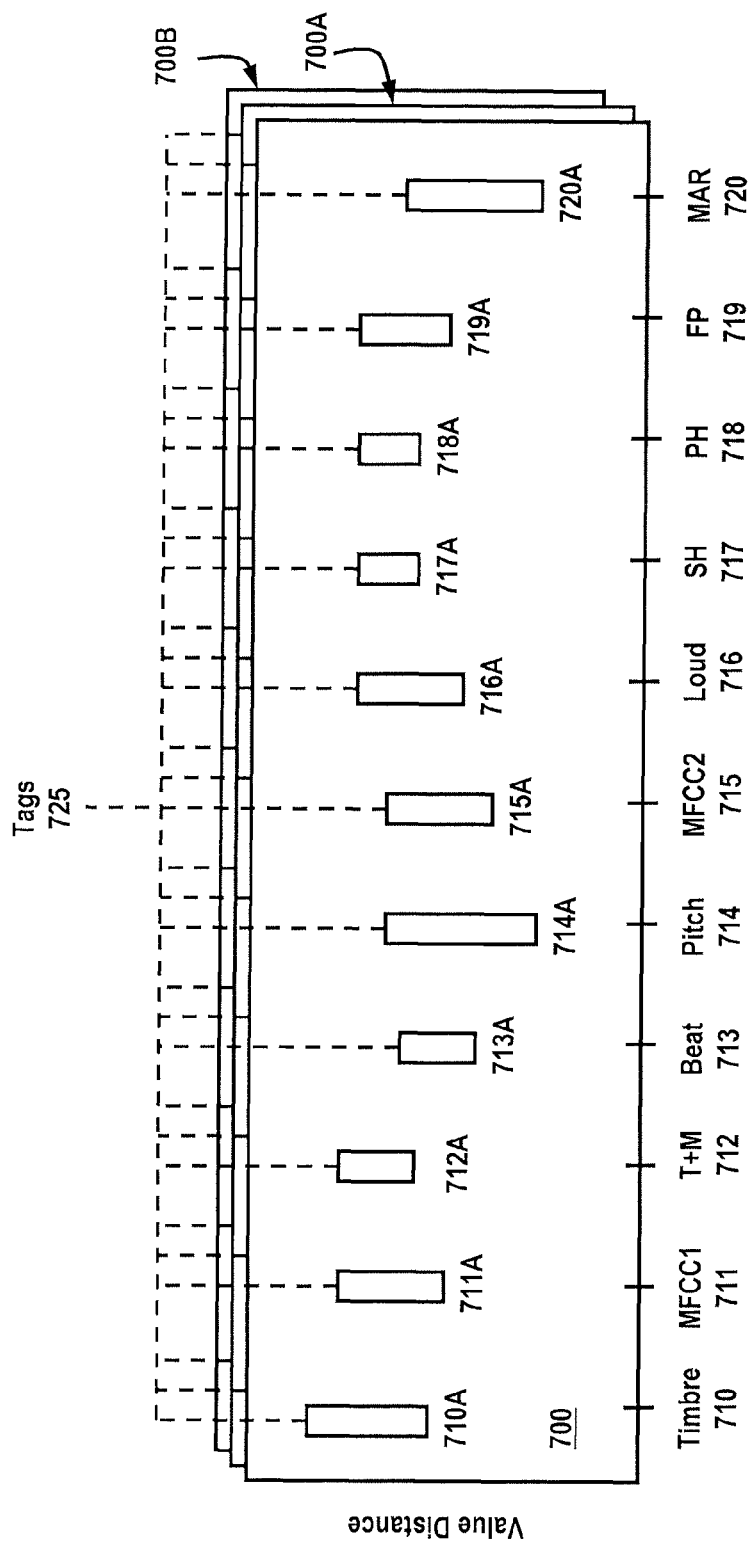
FIG. 7 illustrates an exemplary process for generating tags for use in audio template generation under yet another exemplary embodiment.

FIG. 7 provides an example of a tag arrangement comprising a plurality of extracted features along with a value distance/tolerance, where each feature value is expressed as a tolerable range for later comparison. Under one embodiment, each extracted audio feature is separately measured and collected as ranges (710A-720A) for template 700. Depending on the feature extracted, ranges may be combined, weighted, averaged and/or normalized for unit variance. Ranges are then set against value distances that are determined through any of Euclidean (e.g., 713A, 717A-719A), weighted Euclidean (e.g., 710A-712A, 714A), Kullback-Leibler distances (e.g., 715A, 716A) or others for tag creation/identification 725. In the example of FIG. 7, audio features relating to timbre 710 may include specific measurements directed to mean and variance of the spectral centroid, roll-off, flux, and or percentage of low/high energy frames. Timbre-related measurements may be taken across a plurality of audio signals to establish a set of ranges 710A for a particular tag (725). Subsequent measurements that are compared against these ranges (e.g., using weighted Euclidean distance), and which fall within the predetermined range, may be said to match a feature range for a particular tag. Additional features may include a first MFCC measurement 711, involving the mean and variance of a predetermined number of mel-frequency cepstral coefficients or number of dimensions (711A), and a concatenation of timbre and MFCC features 712, 712A.

Beat histogram features 713 may also be used to identify prominent beats, which may comprise amplitudes and periods of peaks in the histogram, a ratio between the peaks and the sum of all peaks 713A. Pitch 714 may be derived from a histogram of pitches in an audio signal 714A, which may include periods and amplitudes of prominent peaks on a full semitone scale and/or octave independent scale. Additional MFCCs 715 may be estimated from short audio frames, where a Gaussian Mixture Model (GMM) may be trained to model them 715A. Loudness 716 may be measured from the sone of frequency bands distributed on a Bark scale, where a GMM may be trained on the loudness values 716A. Spectral histogram 717 may be formed from a derivative of raw sone features, where the number of loudness levels exceeding a predetermined threshold in each frequency may be counted 717A. A Periodicity histogram 718 may measure periodic beats 718A, or a fluctuation pattern 419 may be used to measure periodicities in a signal 719A. It is understood that the examples of FIG. 7 are merely illustrative, and that other features/techniques described herein may be used for creating tags 725 for template 700. Additionally, other techniques such as a multivariate autoregressive model 720 may be used to capture temporal correlations of MFCCs over relatively short (e.g., 1-2 s) segments to produce feature vectors for each segment (720A). The vectors may be used individually or combined to compare for later comparison to new incoming audio features to identify audio features and characteristics.

Under a preferred embodiment, each of templates (700-700B) is comprised of one or more tags 725. In one embodiment, each tag is associated with a specific audio feature range (710A-720A). In another embodiment, each tag is associated with a plurality of audio feature ranges. For example, a tag relating to a genre, instrument or emotive descriptor may combine audio feature ranges from audio timbre (710A), beat (713A), loudness (716A) and spectral histogram (717A). In another example, the combined features may include audio timbre (710A), MFCC1 (711A), T+M (712A), and loudness (716A). In yet another example, combined features may include beat (713A) and periodicity histogram (718A). As can be appreciated by one skilled in the art, a large number of possibilities are available for developing and customizing tags for retrieval of semantic audio information/data.

Templates are preferably formed using a training process, where known audio signals are fed into a system such as the one illustrated in FIG. 2, and audio features are identified and tagged. For example, a collection of songs, known to be from a specific genre, have a certain number of audio features extracted, where audio feature ranges are determined for each template. The type and number of audio features used is not critical and may be left to the discretion of the designer. If more audio features are used, this will likely result in more accurate and/or granular semantic data.

However, increasing the number of features increases the processing power needed to extract and tag audio features. As the features are extracted, they may joined to form ranges for features, and/or normalized or catenated to form one or more feature vectors that are subsequently tagged. Once the requisite features are tagged, they are formed as part of a template that is deemed representative of a specific genre (e.g., jazz, classical, rock, etc.). The same techniques may be used to form representative templates for instruments, emotive descriptors, etc. As each template is formed, it is stored in a database (e.g., SQL) for retrieval, processing and comparison to new incoming audio. These operations are preferably performed in a backoffice application (e.g., 108, 109) using Qt SQL libraries such as QSqlDatabase and QSqlQuery. The backoffice should also be usable with various engines, from a simple SQLite file to MySQL, PostgreSQL, Oracle, Access DB files or any DB supporting ODBC (Open Data Base Connectivity protocol).

One of the advantages of this configuration is that individual song-vs.-song comparison is not required for semantic processing, which can greatly reduce the database storage need. Instead of requiring thousands or millions of audio data features, databases may contain just a few hundred templates that are representative of a specific audio characteristic. Such a configuration greatly simplifies the data needed for obtaining semantic information on audio. Of course, these audio features may be further decreased or increased, depending on the granularity needed.

Figure 8:
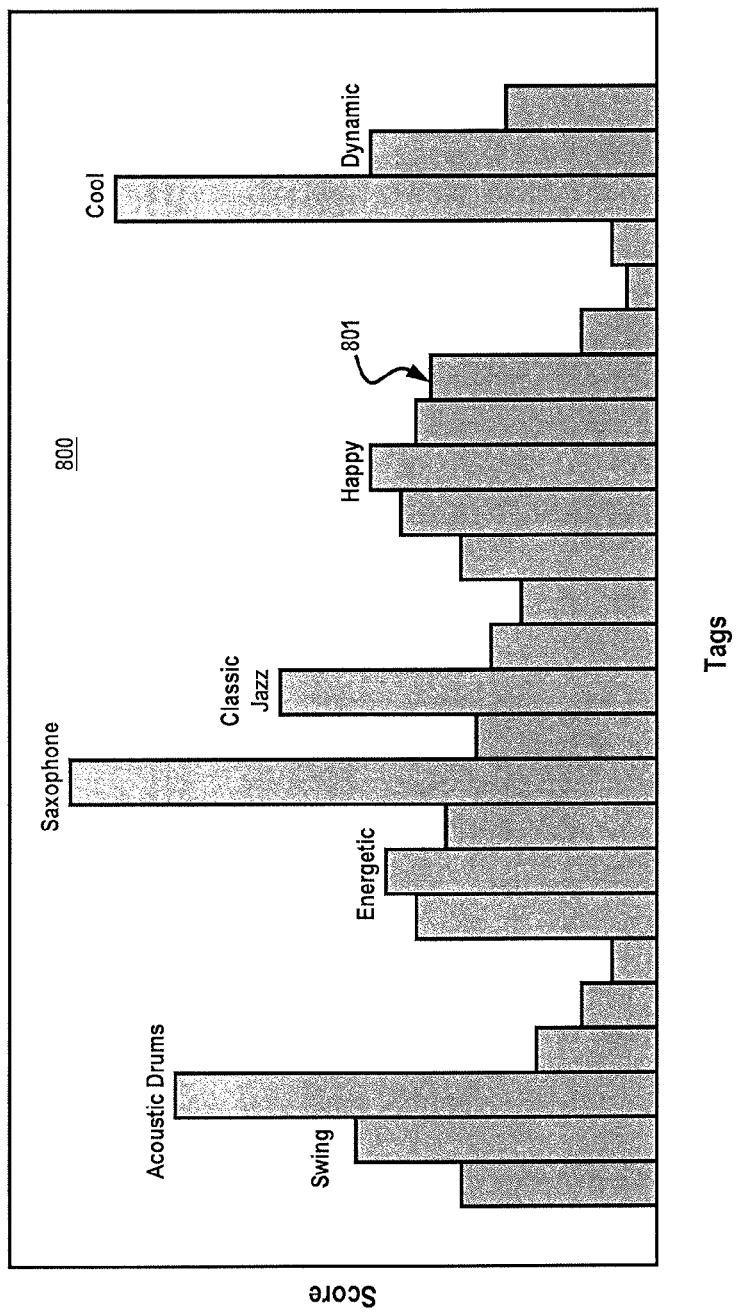
FIG. 8 illustrates an exemplary process for processing audio samples for comparison with audio templates to provide tag scores under yet another exemplary embodiment.
Figures 9, 10A, 10B:
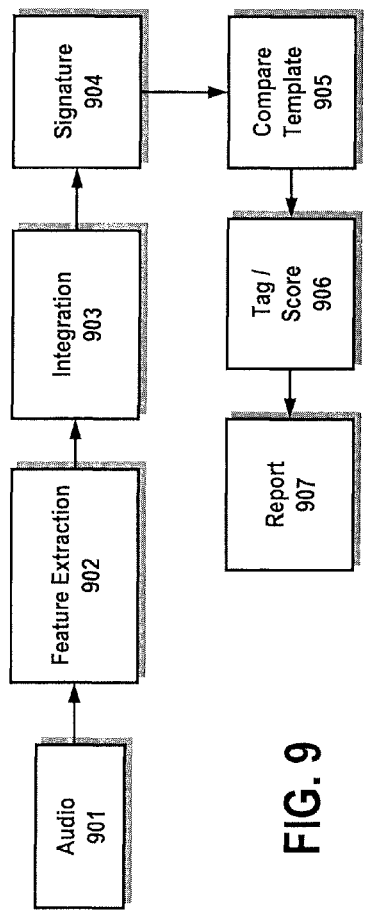
FIG. 9 illustrates an exemplary tag score utilizing the audio processing described above.
FIGS. 10A and 10B illustrate exemplary reports that may be generated from tag scoring under another exemplary embodiment.

Turning to FIG. 8, an exemplary comparison result is illustrated for an incoming audio signal that is processed and compared to an audio template described above. When a new audio signal is received, it may be processed according to a process described below in FIG. 8, and the resulting semantic audio signature is compared to a previously stored temple created during a training process. As audio features are compared to templates, tagged audio features are identified and scored, and may further be aggregated into one or more score file histograms 800, were each file histogram 800 contains a score 801 relating to each respective feature. File 800 may consist of a single feature, or may contain a plurality of different features. In the example of FIG. 8, multiple features are contained in file 800, where features are related to various semantic information such as genre (classic jazz), instrumentation (acoustic drums, saxophone), style (swing), acoustical dynamics (dynamic, energetic) and emotive descriptors (happy). Again, the specific types and numbers of features are not critical and are left to the discretion of the designer. The resulting files are preferably time stamped and stored for later retrieval and processing FIG. 9 provides an example of new incoming audio (or test audio) received on a device (e.g., 104-106), such as a cell phone, smart phone, personal computer, laptop, tablet, set-top-box, media box, and the like. The audio may be captured using a microphone that transduces the ambient audio into electrical form, or captured directly using a sound card, audio interface or the like. Incoming audio 901 is received and subjected to feature extraction 902 and feature integration 903, similar to the techniques described above in connection with FIG. 2. Depending on the device used, the number of extracted audio features may be increased or decreased, depending on the processing power and storage available. A semantic audio signature 904 is then formed from the extracted audio features, and stored on the user device. Under a preferred embodiment, the semantic audio signature is time stamped to indicate a time in which the signature was formed.

Semantic Signature 904 is then transmitted from the device via wired, wireless and/or cellular communication to a remote location, where the semantic signature 904 is compared to audio templates 905, where tags are identified, scored and correlated. Under an alternate embodiment, the device may simply sample a time period of audio and transmit the sample via wired, wireless or cellular communication to a remote site for audio feature extraction, integration and semantic audio signature formation (904). Once tags are scored, they may be collected over a predetermined time period and processed for report generation. Unlike conventional audio signatures, semantic audio signatures may be taken over longer time intervals (e.g., 10-30 sec.), resulting in a saving of processing power.

FIGS. 10A and 10B illustrate a few examples of reports generated using the techniques described above. FIG. 10A illustrates a report 910 for a particular user ("User00001"), where one semantic feature is monitored. In this case, the user's device is monitored to determine the type and/or genre of audio or music that the user was listening to at given times. Here, it can be determined that the user began his morning at 9:20 AM listening to talk programming (e.g., talk radio, podcast, etc.), and at 9:26 AM began listening to classical music. At 10:20 AM, the user listened to jazz, followed by classic rock at 11:20 AM, and returning back to talk programming at 12:00 PM. At 2:00 PM the user then listened to hard rock. FIG. 10B illustrates an exemplary report 911, where multiple semantic features were used for the content discussed in FIG. 10A. Here, in addition to genre-related information (talk, classical, jazz, classic rock, hard rock), other semantic features, including instrumentation (woodwinds, saxophone, electric guitar), style (Baroque, conversational, cool, swing, confrontational, distortion), acoustical dynamics (aggressive, energetic) and emotive descriptors (happy, brooding) may be included as well.

It can be appreciated by those skilled in the art that the semantic information extracted from audio may provide additional and valuable information regarding user listening habits. Such information would be particularly valuable to those engaged in the audience measurement business to determine generic listening habits of users or panelists. Additionally, the semantic information may be used to established "emotional profiles" for users and groups of users during the course of a day, week, month, year, etc. Demographic information may further be used to expand on these profiles to obtain demographically-related listening/emotional information.

It can be further appreciated by those skilled in the art that semantic information disclosed herein is particularly suited for combination with audio codes, and may advantageously supplement information provided by the codes. Read audio codes may be transmitted together or separately from semantic signatures to central server(s) 109 via wired or wireless connection over a data network for forming messages as is known in the art. The messages may then provide identification information (e.g., name of program, song, artist, performer, broadcaster, content provider, etc.) relating to audio 201, which may in turn be combined with semantic audio information to provide even more robust data.

By combining audio codes with semantic information, this creates a powerful tool for assisting audience measurement entities in obtaining more information on the content that panelists are exposed to. Under the present disclosure, the semantic information can provide a deeper understanding of the underlying features of identified audio content. For example, a certain artist may perform songs spanning multiple genres. Using the techniques described herein, it can be automatically determined if certain genres by one artist are more popular than others. Similarly, it can be automatically determined which ones of a plurality of artists of one genre are more popular than others. Furthermore, the techniques described herein may be used in television/streaming programming as well. For example, it may be determined that one or more panelists "tune out" a program when certain semantic features are present (e.g., confrontation, melancholy).

Turning to FIG. 11, a simplified example is provided where decoded codes/messages identify content 1102 (CONT1), and where the corresponding semantic information 1101 is associated to it over a time base (starting from t=0). Here, an 8-segment example is provided where content (CONT1) has a first kind of semantic information (SI1) present for time segments 1 and 2. At time segment 3, a second kind of semantic information (SI2) is present, followed by a third kind (SI3) for time segments 4 and 5. At time segments 6-8, the content returns to having semantic information (SI1). In a practical sense, the semantic information provides a "development" for the content over an extended time period. For example, if CONT1 is music, SI1 may represent a verse portion for a song, SI2 may represent a bridge, and SI3 may represent a chorus. Alternately, if CONT1 is a television program, SI1 may represent dialog, SI2 may represent the presence of dramatic music, and SI3 may represent a confrontational scene. It can be appreciated by those skilled in the art that many variations are possible under the present disclosure.

In addition to providing the development of content, semantic information may also be used to supplement audio signature data as well. Turning now to FIG. 12, a simplified example 1200 is provided, where audio signatures are taken together with the semantic information on a time base to supplement audio signature detection. In this example, audio code ID data 1202 is associated with semantic information 1203 according to timestamps 1201 provided for each. While the timestamps themselves may provide an adequate basis for grouping audio signatures with semantic information, it is preferred that timestamp groupings are performed under a predetermined tolerance (+/−) to take into account possible time drift or skew that may occur during processing on a portable device. If the coes and semantic audio signatures are not being processed simultaneously, a predetermined time delta may also be used to account for the time difference in which audio signatures and semantic audio signatures are generated.

In FIG. 12, a first identified code (CODE035) and related semantic audio information (Info1) is determined at time period 1. The audio code (CODE0035) may be configured to provide specific information for the content (e.g., song), while the semantic information (Info1) may be configured to provide generalized information (e.g., genre, emotive descriptor). At time period 2, no code was detected ("X"), which may occur because of excessive noise or other reason. However, semantic information (Info1) was determined for time period 2. Assuming that time periods 1 and 2 were sufficiently close in time in this example, the presence of the same semantic information during those times would strongly suggest that that the same content (i.e., CODE0035) was being viewed. Accordingly, the content identification for CODE0035 from time period 1 may be extrapolated into time period 2.

Various embodiments disclosed herein provide devices, systems and methods for performing various functions using an audience measurement system that includes audio beaconing. Although specific embodiments are described herein, those skilled in the art recognize that other embodiments may be substituted for the specific embodiments shown to achieve the same purpose. As an example, although terms like "portable" are used to describe different components, it is understood that other, fixed, devices may perform the same or equivalent functions. Also, while specific communication protocols are mentioned in this document, one skilled in the art would appreciate that other protocols may be used or substituted. This application covers any adaptations or variations of the present invention. Therefore, the present invention is limited only by the claims and all available equivalents.

What is claimed is:

1. A processor-based method for producing supplemental information for media containing an embedded audio code, the method comprising:
   obtaining an audio code from a device during a first time period, the audio code representing a first characteristic of the media, wherein the audio code is read from an audio portion of the media;
   obtaining first semantic audio signature data from the device during the first time period, the first semantic audio signature data being a measure of at least one of a temporal feature, a spectral feature, a harmonic feature, or a rhythmic feature relating to a second characteristic of the media; and
   associating the audio code of the first time period to a second time period when the processor determines that second semantic audio signature data of the second time period substantially matches the first semantic audio signature data for the first time period.

2. The method of claim 1, wherein:
   the temporal feature includes at least one of an amplitude, a power, or a zero crossing of at least some of the audio of the media;
   the spectral feature includes at least one of a spectral centroid, a spectral rolloff, a spectral flux, a spectral flatness measure, a spectral crest factor, Mel-frequency cepstral coefficients, Daubechies wavelet coefficients, a spectral dissonance, a spectral irregularity or a spectral inharmonicity of at least some of the audio of the media;
   the harmonic feature includes at least one of a pitch, a tonality, a pitch class profile, harmonic changes, a main pitch class, an octave range of dominant pitch, a main tonal interval relation or an overall pitch strength of at least some of the audio of the media; and
   the rhythmic feature includes at least one of a rhythmic structure, a beat period, a rhythmic fluctuation or an average tempo for at least some of the audio of the media.

3. The method of claim 1, wherein the audio code is decoded by transforming at least some of the audio from a time domain to a frequency domain.

4. The method of claim 1, wherein the first semantic audio signature data is formed by transforming at least some of the audio from a time domain to a frequency domain.

5. An apparatus for producing supplemental information for media containing an audio code, the apparatus comprising:
   a processor to:
      obtain an audio code from a device during a first time period, the audio code representing a first characteristic of the media, wherein the audio code is read from an audio portion of the media;

obtain first semantic audio signature data from the device during the first time period, the first semantic audio signature data being a measure of at least one of a temporal feature, a spectral feature, a harmonic feature, or a rhythmic feature relating to a second characteristic of the media; and associate the audio code of the first time period to a second time period when second semantic audio signature data of the second time period substantially matches the first semantic audio signature data for the first time period.

6. The apparatus of claim 5, wherein:

the temporal feature includes at least one of an amplitude, a power and a zero crossing of at least some of the audio of the media;

the spectral feature includes at least one of a spectral centroid, a spectral rolloff, a spectral flux, a spectral flatness measure, a spectral crest factor, Mel-frequency cepstral coefficients, Daubechies wavelet coefficients, a spectral dissonance, a spectral irregularity, or a spectral inharmonicity of at least some of the audio of the media;

the harmonic feature includes at least one of a pitch, a tonality, a pitch class profile, harmonic changes, a main pitch class, an octave range of dominant pitch, a main tonal interval relation, or an overall pitch strength of at least some of the audio of the media; and the rhythmic feature includes at least one of a rhythmic structure, a beat period, a rhythmic fluctuation, or an average tempo for at least some of the audio of the media.

7. The apparatus of claim 5, wherein the audio code is formed by transforming at least some of the audio from a time domain to a frequency domain.

8. The apparatus of claim 5, wherein the semantic audio signature data is formed by transforming at least some of the audio from a time domain to a frequency domain.

9. A tangible computer readable storage device comprising instructions, that when executed, cause a computing device to at least:

obtain an audio code from a device during a first time period, the audio code representing a first characteristic of media;

obtain first semantic audio signature data from the device during the first time period, the first semantic audio signature data being a measure of at least one of a temporal feature, a spectral feature, a harmonic feature, or a rhythmic feature relating to a second characteristic of the media; and associate the audio code of the first time period to a second time period when second semantic audio signature data of the second time period substantially matches the first semantic audio signature data of the first time period.

10. The tangible computer readable storage device of claim 9, wherein:

the temporal feature includes at least one of an amplitude, a power and a zero crossing of at least some audio of the media;

the spectral feature includes at least one of a spectral centroid, a spectral rolloff, a spectral flux, a spectral flatness measure, a spectral crest factor, Mel-frequency cepstral coefficients, Daubechies wavelet coefficients, a spectral dissonance, a spectral irregularity, or a spectral inharmonicity of at least some of the audio of the media;

the harmonic feature includes at least one of a pitch, a tonality, a pitch class profile, harmonic changes, a main pitch class, an octave range of dominant pitch, a main tonal interval relation, or an overall pitch strength of at least some of the audio of the media; and the rhythmic feature includes at least one of a rhythmic structure, a beat period, a rhythmic fluctuation, or an average tempo for at least some of the audio of the media.

11. The tangible computer readable storage device of claim 9, wherein the audio code is formed by transforming at least some of the audio from a time domain to a frequency domain.

12. The tangible computer readable storage device of claim 9, wherein the semantic audio signature data is formed by transforming at least some of the audio from a time domain to a frequency domain.

13. A processor-based method for producing supplemental information for media containing audio codes, the method comprising:

obtaining audio codes from a device, the audio codes representing a first characteristic of the media, wherein the audio codes are read from audio portions of the media;

obtaining semantic audio signature data from the device, the semantic audio signature data includes at least one of a temporal feature, a spectral feature, a harmonic feature, or a rhythmic feature relating to a second characteristic of the media;

associating the semantic audio signature data to the audio codes; and processing the associated semantic audio signature data and audio codes to determine a change in the second characteristic relative to the first characteristic.

14. The method of claim 13, wherein:

the temporal feature includes at least one of an amplitude, a power, or a zero crossing of at least some of the audio of the media, the spectral feature includes at least one of a spectral centroid, a spectral rolloff, a spectral flux, a spectral flatness measure, a spectral crest factor, Mel-frequency cepstral coefficients, Daubechies wavelet coefficients, a spectral dissonance, a spectral irregularity, or a spectral inharmonicity of at least some of the audio of the media, the harmonic feature includes at least one of a pitch, a tonality, a pitch class profile, harmonic changes, a main pitch class, an octave range of dominant pitch, a main tonal interval relation, or an overall pitch strength of at least some of the audio of the media, and the rhythmic feature includes at least one of a rhythmic structure, a beat period, a rhythmic fluctuation or an average tempo for at least some of the audio of the media.

15. The method of claim 13, wherein the first characteristic includes one of a media identification, a media distributor identification, or a media broadcaster identification.

16. The method of claim 13, wherein the second characteristic includes one of a genre, an instrumentation, a style, acoustical dynamics, or an emotive descriptor.

17. The method of claim 13, wherein the audio codes are formed by transforming at least some of the media from a time domain to a frequency domain.

18. The method of claim 13, wherein the semantic audio signature data is formed by transforming at least some of the media from a time domain to a frequency domain.

19. An apparatus for producing supplemental information for media containing audio codes, the apparatus comprising:
a processor to:
obtain audio codes from a device, the audio codes representing a first characteristic of the media, wherein the audio codes are read from audio portions of the media;
obtain semantic audio signature data from the device, the semantic audio signature data being a measure of at least one of a temporal feature, a spectral feature, a harmonic feature, or a rhythmic feature relating to a second characteristic of the media;
associate the semantic audio signature data to the audio codes; and
process the associated semantic audio signature data and audio codes to determine a change in the second characteristic relative to the first characteristic.

20. The apparatus of claim 19, wherein:
the temporal feature includes at least one of an amplitude, a power, or a zero crossing of at least some of the audio of the media,
the spectral feature includes at least one of a spectral centroid, a spectral rolloff, a spectral flux, a spectral flatness measure, a spectral crest factor, Mel-frequency cepstral coefficients, Daubechies wavelet coefficients, a spectral dissonance, a spectral irregularity, or a spectral inharmonicity of at least some of the audio of the media,
the harmonic feature includes at least one of a pitch, a tonality, a pitch class profile, harmonic changes, a main pitch class, an octave range of dominant pitch, a main tonal interval relation, or an overall pitch strength of at least some of the audio of the media, and
the rhythmic feature includes at least one of a rhythmic structure, a beat period, a rhythmic fluctuation or an average tempo for at least some of the audio of the media.

21. The apparatus of claim 19, wherein the first characteristic includes one of a media identification, a media distributor identification, or a media broadcaster identification.

22. The apparatus of claim 19, wherein the second characteristic includes one of a genre, an instrumentation, a style, acoustical dynamics, or an emotive descriptor.

23. The apparatus of claim 19, wherein the audio codes are formed by transforming at least some of the media from a time domain to a frequency domain.

24. The apparatus of claim 19, wherein the semantic audio signature data is formed by transforming at least some of the media from a time domain to a frequency domain.

25. A tangible computer readable storage device comprising instructions, that when executed, cause a computing device to at least:
obtain audio codes from a device, the audio codes representing a first characteristic of media;
obtain semantic audio signature data from the device, the semantic audio signature data being a measure of at least one of a temporal feature, a spectral feature, a harmonic feature, or a rhythmic feature relating to a second characteristic of the media;
associate the semantic audio signature data to the audio codes; and
process the associated semantic audio signature data and audio codes to determine a change in the second characteristic relative to the first characteristic.

26. The tangible computer readable storage device of claim 25, wherein:
the temporal feature includes at least one of an amplitude, a power, or a zero crossing of at least some audio of the media,
the spectral feature includes at least one of a spectral centroid, a spectral rolloff, a spectral flux, a spectral flatness measure, a spectral crest factor, Mel-frequency cepstral coefficients, Daubechies wavelet coefficients, a spectral dissonance, a spectral irregularity, or a spectral inharmonicity of at least some of the audio of the media,
the harmonic feature includes at least one of a pitch, a tonality, a pitch class profile, harmonic changes, a main pitch class, an octave range of dominant pitch, a main tonal interval relation, or an overall pitch strength of at least some of the audio of the media, and
the rhythmic feature includes at least one of a rhythmic structure, a beat period, a rhythmic fluctuation or an average tempo for at least some of the audio of the media.

27. The tangible computer readable storage device of claim 25, wherein the second characteristic includes one of a genre, an instrumentation, a style, acoustical dynamics, or an emotive descriptor.

28. The tangible computer readable storage device of claim 25, wherein the audio codes are formed by transforming at least some of the media from a time domain to a frequency domain.

29. The tangible computer readable storage device of claim 25, wherein the semantic audio signature data is formed by transforming at least some of the media from a time domain to a frequency domain.

30. The tangible computer readable storage device of claim 25, wherein the first characteristic includes one of a media identification, a media distributor identification, or a media broadcaster identification.

* * * * *